(12) United States Patent
Trautner et al.

(10) Patent No.: US 8,388,417 B2
(45) Date of Patent: Mar. 5, 2013

(54) LARGE ANGLE GRINDER

(75) Inventors: Paul K. Trautner, York, PA (US); Philip T. Miller, Phoenix, MD (US); Kevin S. Agan, Fallston, MD (US); Erik Ekstrom, Woodstock, MD (US); Junyi Xie, Wuxi (CN); Yaping Yang, Suzhou (CN); Jason R. Melvin, Baltimore, MD (US); Gregg L. Sheddy, Shrewsbury, PA (US)

(73) Assignee: Black & Decker Inc., Newark, DE (US)

( * ) Notice: Subject to any disclaimer, the term of this patent is extended or adjusted under 35 U.S.C. 154(b) by 0 days.

(21) Appl. No.: 13/192,647

(22) Filed: Jul. 28, 2011

(65) Prior Publication Data

US 2011/0281507 A1 Nov. 17, 2011

Related U.S. Application Data

(62) Division of application No. 11/549,264, filed on Oct. 13, 2006, now Pat. No. 7,988,538.

(51) Int. Cl.
*B24B 55/00* (2006.01)

(52) U.S. Cl. ........ 451/344; 451/354; 451/358; 451/359; 451/442

(58) Field of Classification Search ............ 74/531; 451/344, 354, 358, 359, 442
See application file for complete search history.

(56) References Cited

U.S. PATENT DOCUMENTS

| | | | |
|---|---|---|---|
| 1,830,580 A | 11/1931 | Wappat | |
| 1,929,662 A | 10/1933 | Wappat | |
| 2,211,216 A * | 8/1940 | Oster | 451/358 |
| 2,273,626 A | 2/1942 | Connell | |
| 3,021,723 A | 2/1962 | Happe | |
| 3,829,721 A | 8/1974 | Rosenthal, Jr. | |
| 3,899,852 A * | 8/1975 | Batson | 451/359 |
| 3,943,789 A | 3/1976 | Mann et al. | |
| 4,122,320 A | 10/1978 | Edgell et al. | |
| 4,322,647 A | 3/1982 | Neroda et al. | |
| 4,489,525 A * | 12/1984 | Heck | 451/344 |
| 4,637,276 A | 1/1987 | Holan et al. | |
| 4,690,252 A | 9/1987 | Kottke et al. | |
| 4,855,631 A | 8/1989 | Sato et al. | |
| 5,005,295 A | 4/1991 | Fushiya et al. | |
| 5,054,352 A | 10/1991 | Fushiya et al. | |
| 5,311,089 A | 5/1994 | Stroetgen et al. | |
| 5,315,193 A | 5/1994 | Kummer et al. | |
| 5,483,727 A | 1/1996 | Chang et al. | |
| 5,577,600 A | 11/1996 | Schoene et al. | |
| 5,685,080 A | 11/1997 | Amano et al. | |
| 5,778,747 A | 7/1998 | Chen et al. | |
| 5,878,480 A | 3/1999 | Rawls | |
| 5,969,312 A | 10/1999 | Svetlik et al. | |

(Continued)

FOREIGN PATENT DOCUMENTS

| | | |
|---|---|---|
| DE | 1855463 | 7/1962 |
| DE | 1488595 | 6/1969 |

(Continued)

*Primary Examiner* — Timothy V Eley
(74) *Attorney, Agent, or Firm* — Harness, Dickey & Pierce, P.L.C.

(57) ABSTRACT

An angle grinder is provided including a radial fan assembly. The radial fan assembly is configured to direct exhaust radially outwardly and axially away from a user of the angle grinder. Brush card assemblies for an angle grinder are also provided. The brush card assemblies provide for the securing of brush cards to a field case of the angle grinder by the interface between the field case and brush cards. Additionally, a spindle lock mechanism and a safety mechanism for an angle grinder are provided.

5 Claims, 22 Drawing Sheets

U.S. PATENT DOCUMENTS

| | | | |
|---|---|---|---|
| 6,277,013 B1 * | 8/2001 | Sasaki et al. | 451/360 |
| 6,350,087 B1 | 2/2002 | Berry et al. | |
| 6,488,451 B1 | 12/2002 | Hartman | |
| 6,518,686 B2 | 2/2003 | Campbell et al. | |
| 2002/0123301 A1 * | 9/2002 | Chi | 451/344 |
| 2003/0190877 A1 | 10/2003 | Gallagher et al. | |
| 2005/0247463 A1 | 11/2005 | Wuensch | |

FOREIGN PATENT DOCUMENTS

| | | |
|---|---|---|
| DE | 2816398 A1 | 10/1979 |
| DE | 2910845 | 2/1980 |
| DE | 8010217 | 7/1980 |
| DE | 3018775 C2 | 12/1982 |
| DE | 3120899 C2 | 10/1983 |
| DE | 3007304 C2 | 4/1987 |
| DE | 4003031 A1 | 8/1991 |
| DE | 9006171.3 | 11/1991 |
| DE | 3322553 C2 | 2/1992 |
| DE | 4337023 A1 | 5/1995 |
| DE | 19707215 A1 | 9/1997 |
| DE | 29622019 U1 | 5/1998 |
| DE | 29702947 U1 | 7/1998 |
| DE | 19821145 C2 | 4/2000 |
| DE | 10034466 A1 | 1/2002 |
| DE | 10054537 A1 | 6/2002 |
| DE | 10065281 A1 | 7/2002 |
| EP | 0129348 A2 | 12/1984 |
| EP | 0244203 A2 | 11/1987 |
| EP | 0425492 B1 | 1/1990 |
| EP | 0458080 B1 | 3/1994 |
| EP | 0513003 B1 | 5/1994 |
| EP | 0615815 A1 | 9/1994 |
| EP | 0469938 B1 | 5/1995 |
| EP | 0691180 | 1/1996 |
| EP | 1002624 A2 | 5/2000 |
| EP | 0881754 B1 | 1/2002 |
| EP | 1207020 A2 | 5/2002 |
| EP | 0870928 B1 | 6/2003 |
| EP | 1327497 | 7/2003 |
| EP | 1398864 A2 | 3/2004 |
| EP | 0943808 B1 | 6/2004 |
| EP | 0935318 B1 | 8/2004 |
| EP | 1016504 B1 | 1/2005 |
| EP | 1632315 | 3/2006 |
| EP | 1670122 | 6/2006 |
| WO | 02/50962 A1 | 6/2002 |
| WO | 03/107492 A1 | 12/2003 |

* cited by examiner

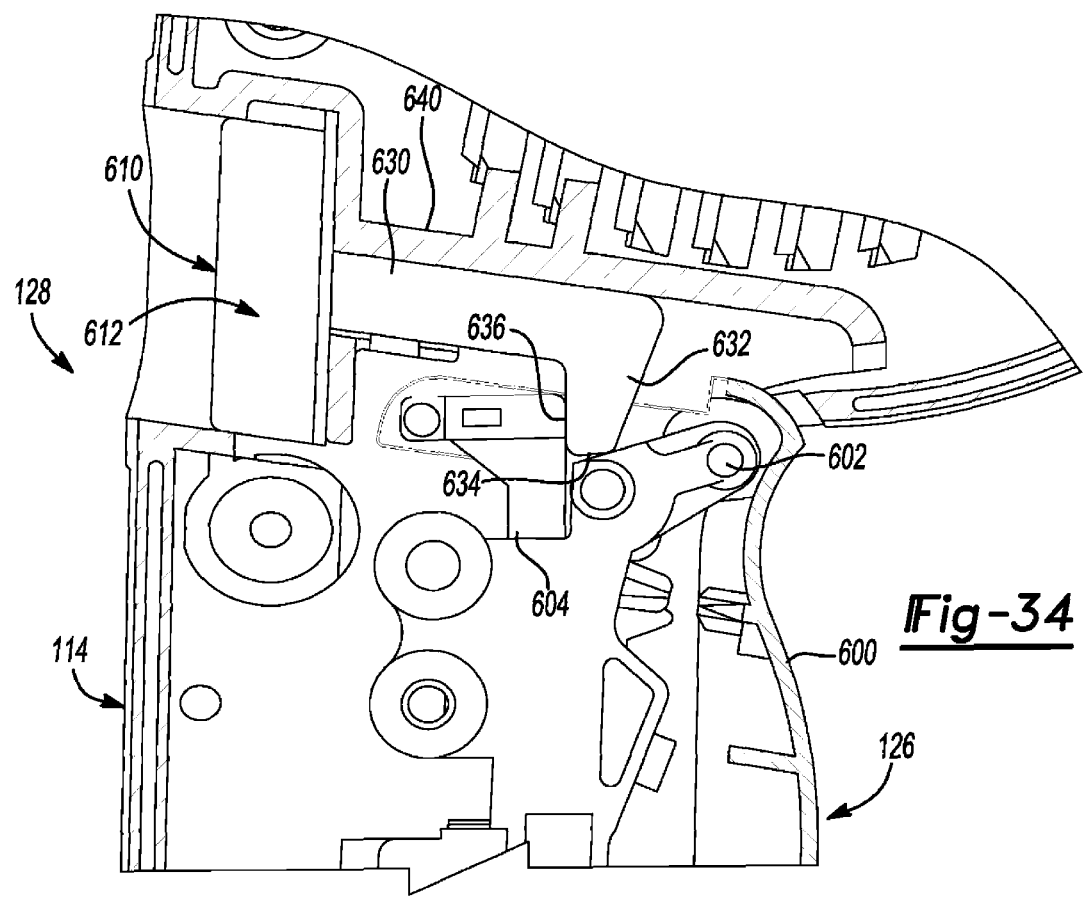

LARGE ANGLE GRINDER

CROSS-REFERENCE TO RELATED APPLICATIONS

This application is a divisional of U.S. patent application Ser. No. 11/549,264 filed on Oct. 13, 2006. The entire disclosure of the above application is incorporated herein by reference.

FIELD

The present disclosure generally relates to angle grinders, and generally describes various features of a large angle grinder (LAG). It will be appreciated, however, that other angle grinders are known in the art, including medium angle grinders (MAG) and small angle grinders (SAG). Therefore, it will be further appreciated that each of the herein described features may be readily adapted for use with a LAG, MAG, and/or SAG as well as other power tools.

BACKGROUND AND SUMMARY

The statements in this section merely provide background information related to the present disclosure and may not constitute prior art.

Angle grinding tools are commonly used for grinding and sanding applications. Angle grinders include a rotary shaft such as a wheel spindle for driving a grinding wheel mounted thereon. The present application describes several improvements for angle grinders.

The present disclosure provides a radial fan assembly for a large angle grinder. The radial fan assembly directs exhaust radially outwardly and axially away from a user of the large angle grinder. The radial fan assembly can provide for efficient operation of the tool.

The present disclosure further provides brush card assemblies for a large angle grinder. The brush card assemblies include brush cards and are secured by an interface between the brush cards and the tool housing. Therefore, the brush card assemblies can provide for simple assembly of the tool.

Additionally, the present disclosure provides for an improved and cost efficient spindle lock mechanism and safety mechanism. The spindle lock mechanism of the present disclosure is configured to experience relatively low stress and avoid coast-down engagement. The safety mechanism of the present disclosure can be separate from an operating switch of the tool and thus is cost efficient.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

FIG. 34 is cross sectional view of the handle portion of FIG. 32 including an engaged safety switch and trigger assembly.

DETAILED DESCRIPTION

Figure 1:
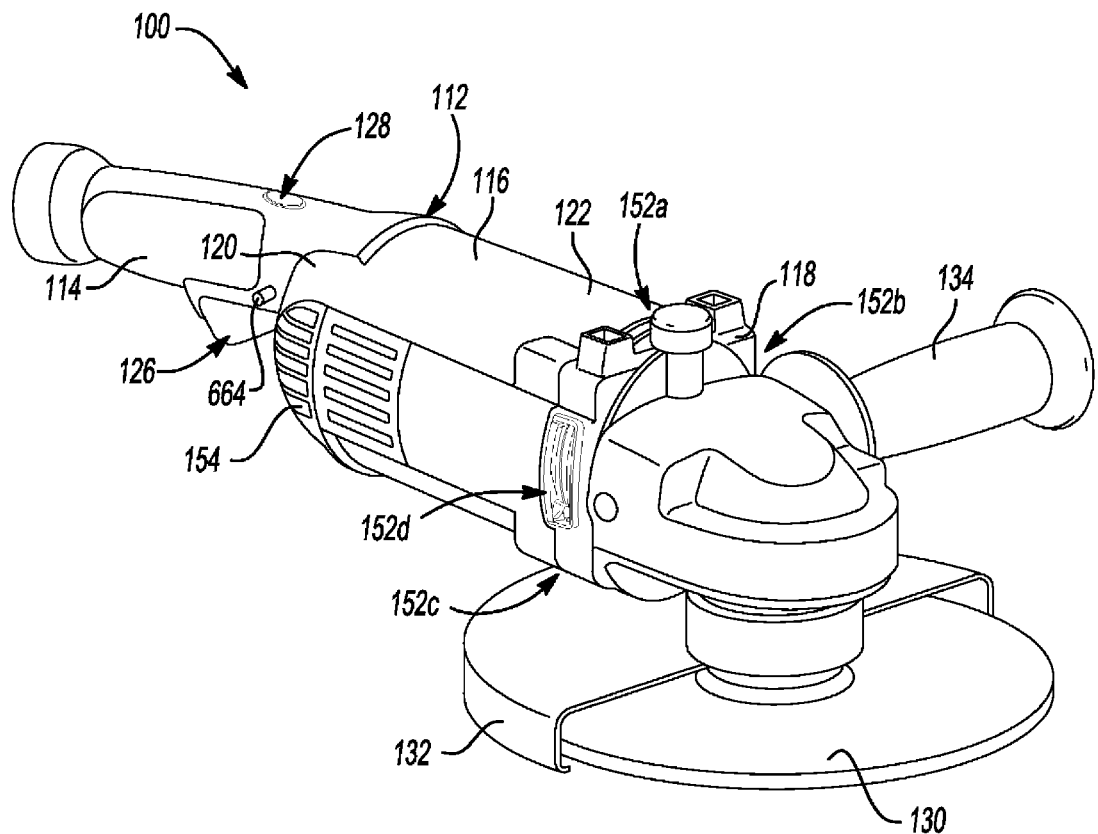
FIG. 1 is a perspective view of a large angle grinder according to the principles of the present disclosure.

The following description is merely exemplary in nature and is not intended to limit the present disclosure, application, or uses. It should be understood that throughout the drawings, corresponding reference numerals indicate like or corresponding parts and features. For example, like elements may be referred to by the reference indicia 75 and 75'. Additionally, as used herein, the terms "axial" and "axially" refer to a direction substantially parallel to an axis of rotation of a shaft according to the principles of the present disclosure. Furthermore, as used herein, the terms "radial" and "radially" refer to directions substantially perpendicular to an axis of a shaft according to the principles of the present disclosure.

According to the principles of the present disclosure, an angle grinder is provided including a radial fan assembly. The radial fan assembly is configured to direct exhaust radially outwardly and axially away from a user of the angle grinder. Brush card assemblies for an angle grinder are also provided. The brush card assemblies provide for the securing of brush cards to a field case of the angle grinder by the interface between the field case and brush cards. Additionally, a spindle lock mechanism and a safety mechanism for an angle grinder are provided.

Figure 2:
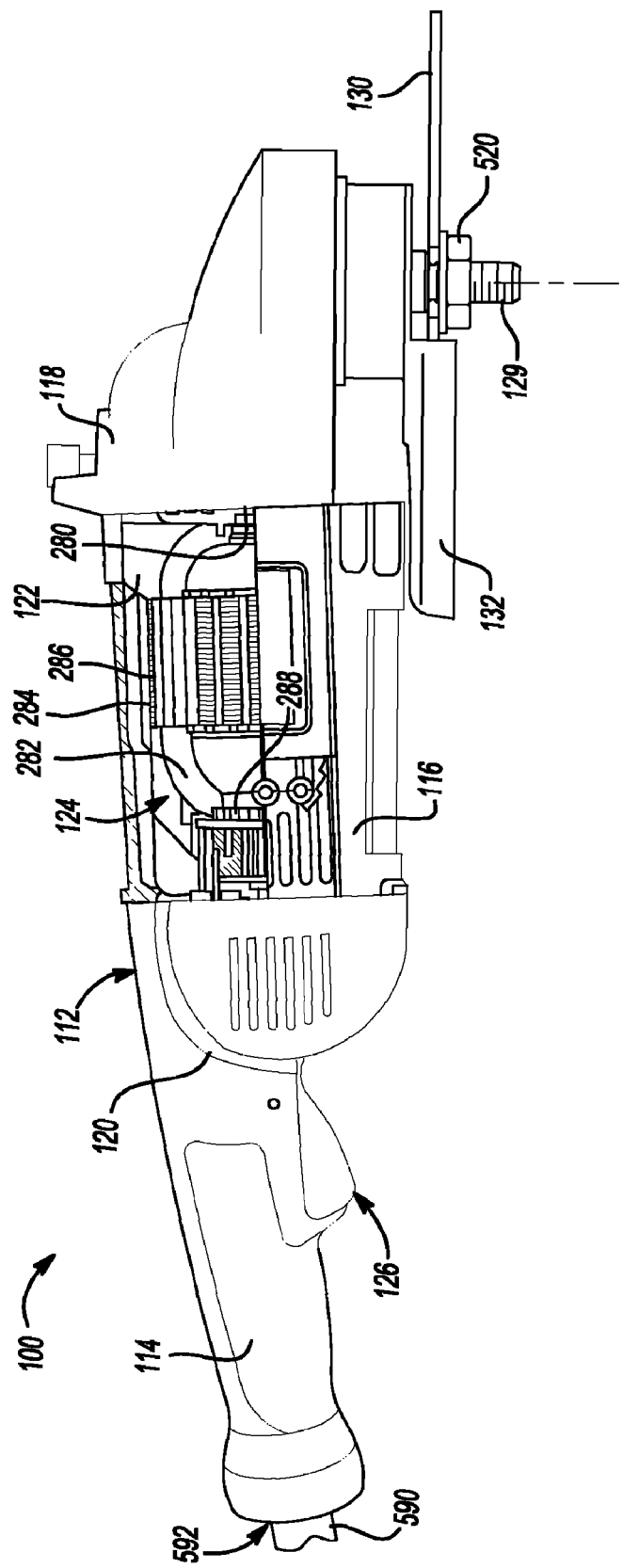
FIG. 2 is a side view of a large angle grinder according to the principles of the present disclosure with a partial cutaway view.

Referring to FIGS. 1-2, a large angle grinder (LAG) 100 can include a housing 112 having a handle portion 114, a field case 116 and a gear case 118. Field case 116 can have a first end 120 and a second end 122. Handle portion 114 can be formed proximate first end 120, and gear case 118 can be fixedly attached proximate second end 122. Field case 116 can support a motor 124 therein for powering LAG 100.

LAG 100 can include a switch mechanism 126, a safety mechanism 128, and associated components therewith mounted in handle portion 114. LAG 100 can also include a wheel spindle 129 (FIG. 2) extending from gear case 118. Furthermore, LAG 100 can include a grinder wheel 130 selectively attachable to wheel spindle 129 and a wheel guard 132 coupled to gear case 118. Wheel spindle 129 and grinder wheel 130 can be operably coupled to motor 124 for powering rotation thereof during operation of LAG 100. Additionally, LAG 100 can include an adjustable handle component 134 attached to gear case 118. Handle component 134 can be selectively configured by an operator of LAG 100.

Radial Fan

Figure 13:
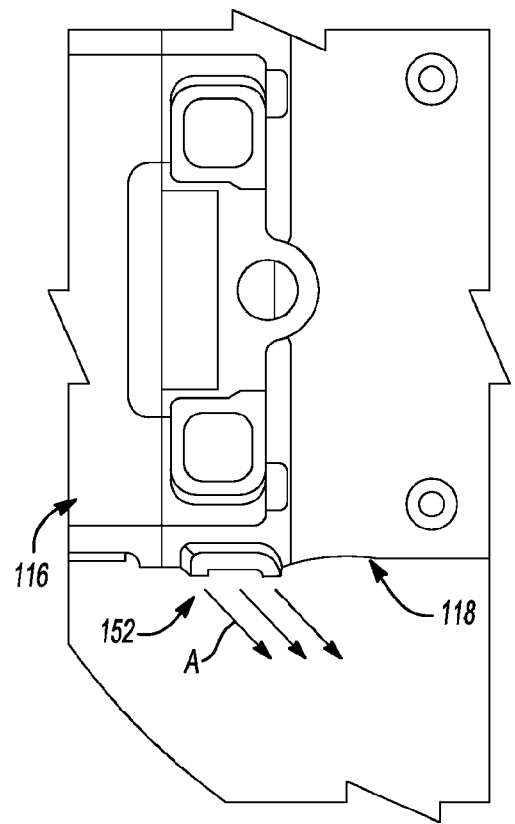
FIG. 13 is a top view of a portion of a large angle grinder according to the principles of the present disclosure.
Figure 14:
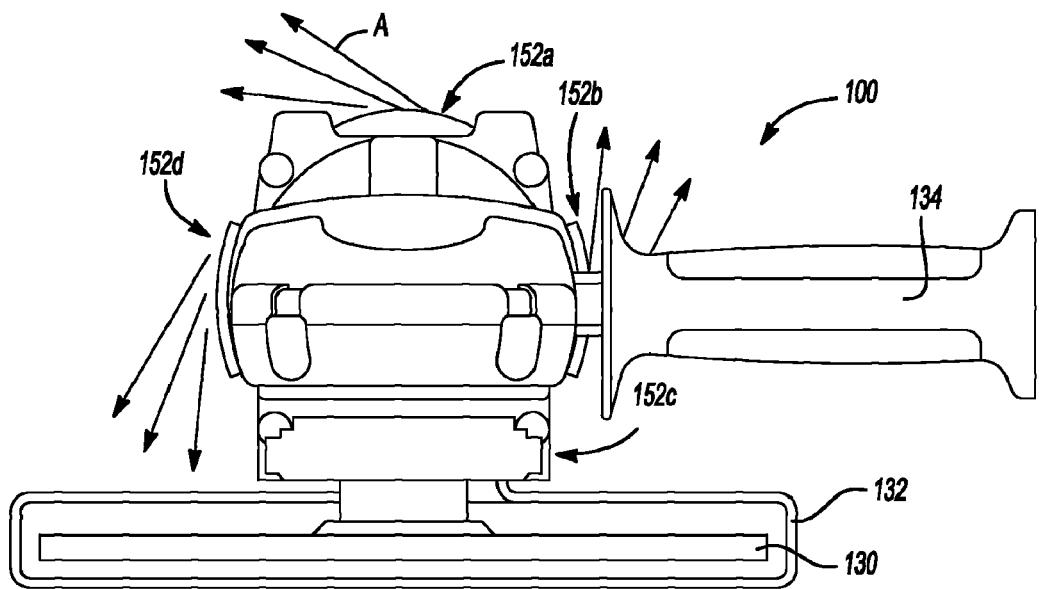
FIG. 14 is an end view of a large angle grinder according to the principles of the present disclosure.

With further reference to FIGS. 3-14, LAG 100 can include a radial fan assembly 150 disposed between field case 116 and gear case 118. Radial fan assembly 150 can include exhaust vents 152a-d (FIGS. 1, 14) disposed around LAG 100. In particular, radial fan assembly 150 can include fan exhaust vents 152a, 152b, 152c, 152d (FIG. 14). As described in more detail below, radial fan assembly 150 can operate to draw air in intake vents 154 disposed at the first end 120 of field case 116 (FIG. 1) and exhaust the air out of exhaust vents 152a-d.

Radial fan assembly 150 can include a fan component 156, a baffle component 158, and gear case 118. Fan component 156 can be coupled between baffle component 158 and gear case 118 and can be operably coupled to the motor for powering rotation thereof. Baffle component 158 can be directly coupled to field case 116.

Figure 3:
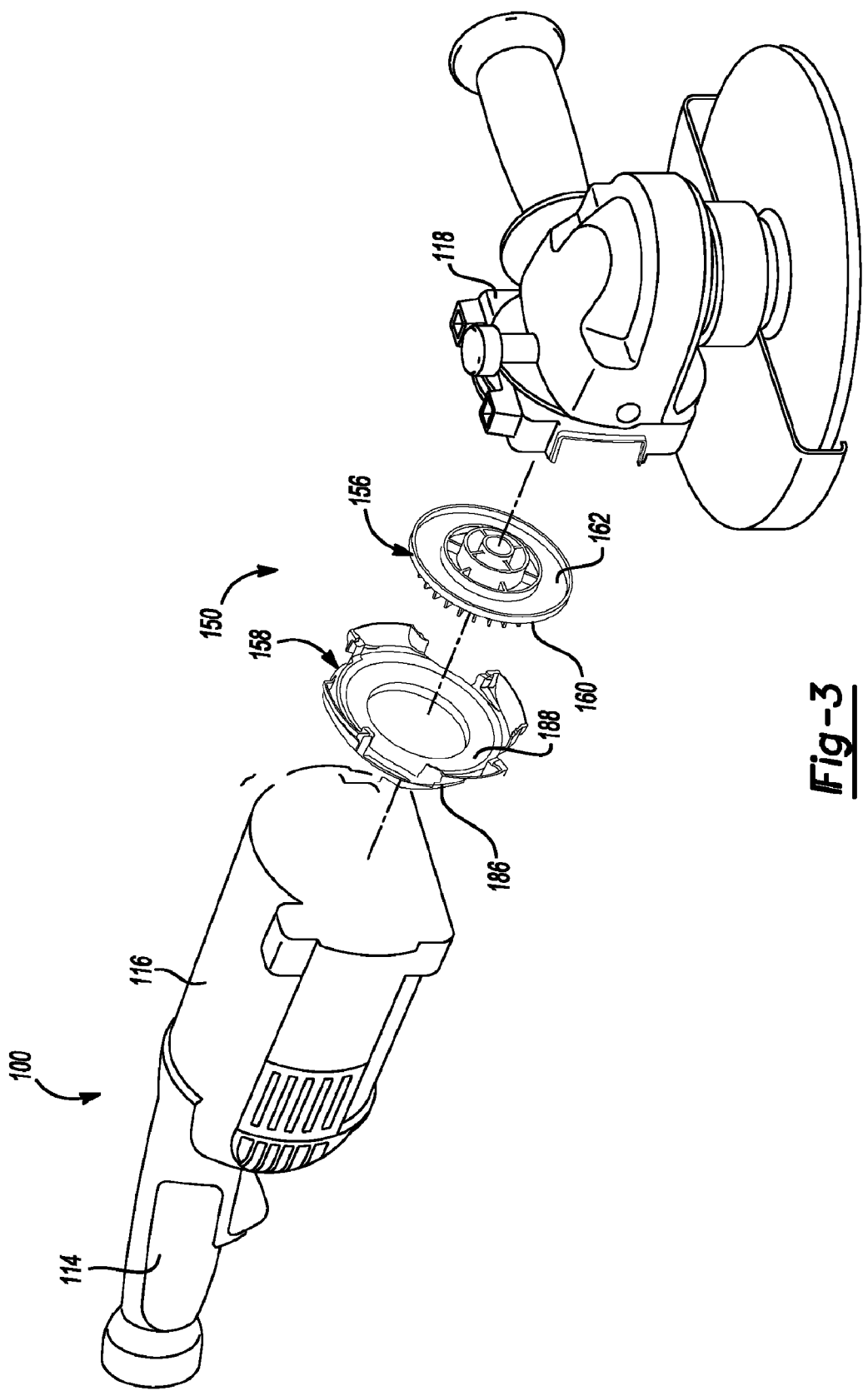
FIG. 3 is an exploded perspective view of a radial fan assembly of a large angle grinder according to the principles of the present disclosure.
Figure 4:
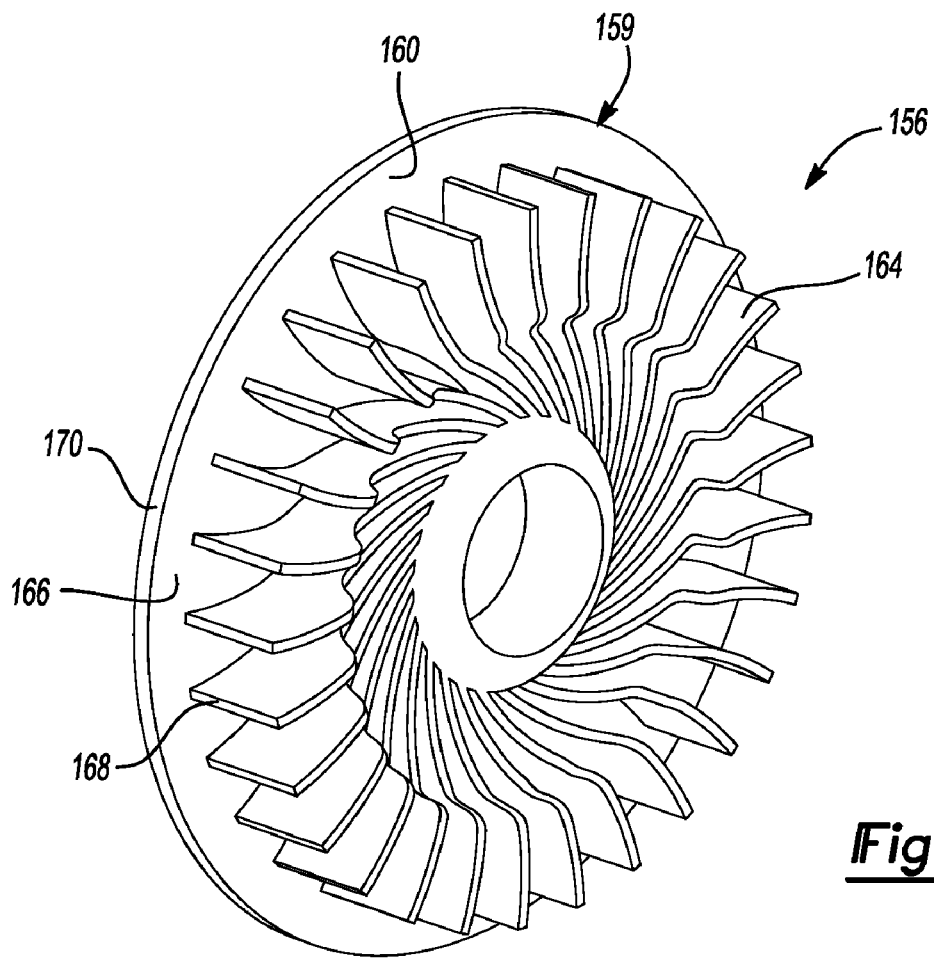
FIG. 4 is a perspective view of a fan component of a radial fan assembly for a large angle grinder according to the principles of the present disclosure.
Figure 5:
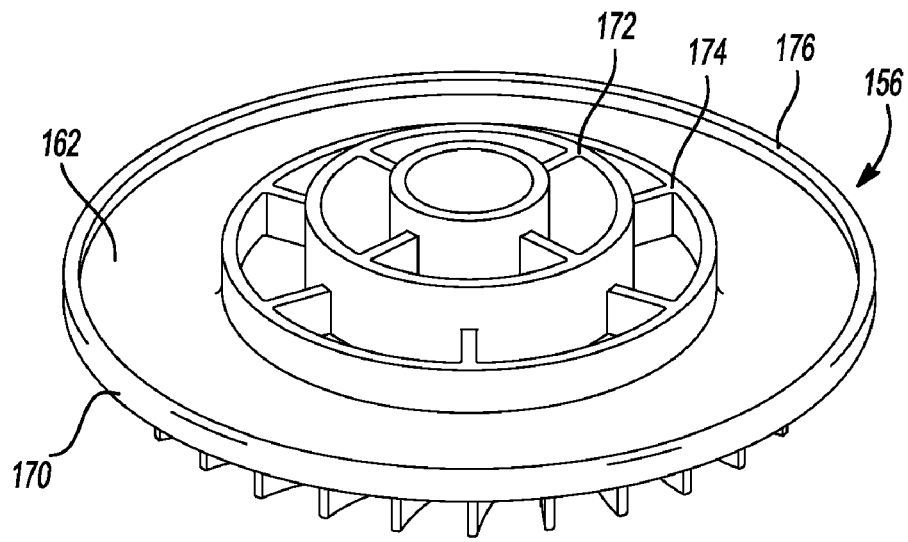
FIG. 5 is another perspective view of the fan component of FIG. 4.

Referring in particular to FIGS. 4-5, fan component 156 can have a back plate 159 including a first side 160 (FIG. 4) and a second side 162 (FIG. 5). Fan component 156 can be positioned with first side 160 facing field case 116 and second side 162 facing gear case 118, as illustrated in FIG. 3. Back plate 159 can be sized to effectively seal gear case 118 from radial fan assembly 150 and field case 116 to inhibit air circulation therebetween. Such a configuration can help prevent unwanted pressurization of gear case 118 and back pressure on radial fan assembly 150.

Back plate 159 can include a plurality of blades 164 extending axially outwardly from first side 160. Blades 164 can be configured to draw air through field case 116 toward first side 160 and direct the air radially from fan component 156 when fan component 156 rotates. Furthermore, blades 164 can be configured so that back plate 159 defines an outside area 166 on first side 160 between radially outward ends 168 of blades 164 and a perimeter 170 thereof.

Back plate 159 can further include ribs 172, 174, 176 extending axially outwardly from second side 162. Ribs 172, 174 can have radially inward positions on second side 162. Rib 176 can have a radially outward position on second side 162 proximate perimeter 170 of back plate 159. As a user of LAG 100 would see blades 164, outside area 166, perimeter 170, and rib 176 when looking into exhaust vents 152a-d (see, for example, exhaust vent 152a in FIG. 12), these features can provide a visually clean interior surface of LAG 100.

Figure 6:
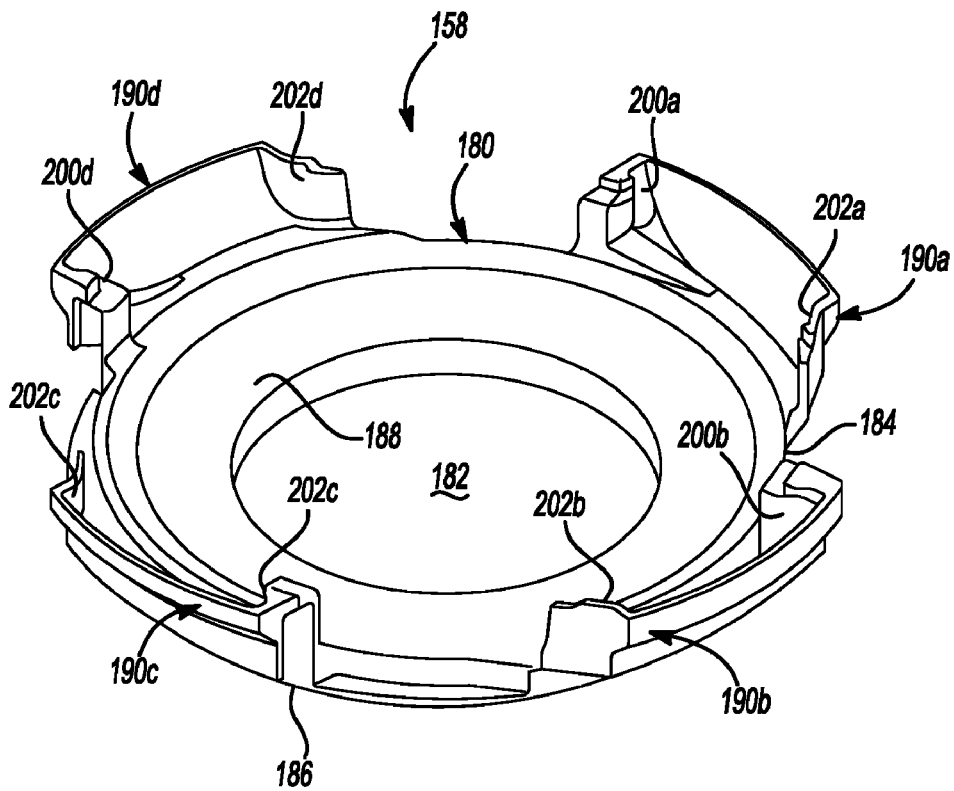
FIG. 6 is a perspective view of a baffle component of a radial fan assembly for a large angle grinder according to the principles of the present disclosure.
Figure 7:
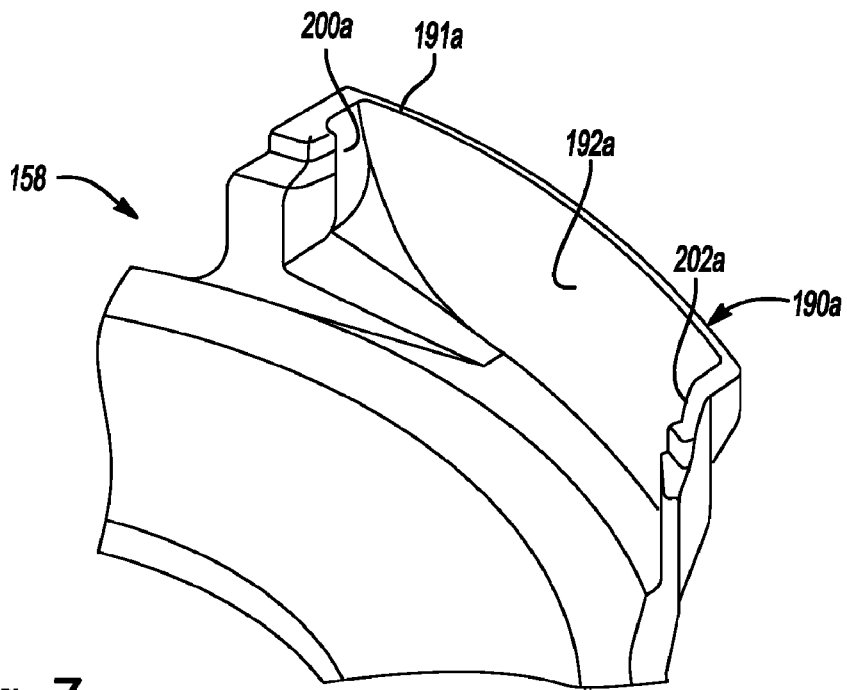
FIG. 7 is a perspective view of a portion of the baffle component of FIG. 6.
Figure 8:
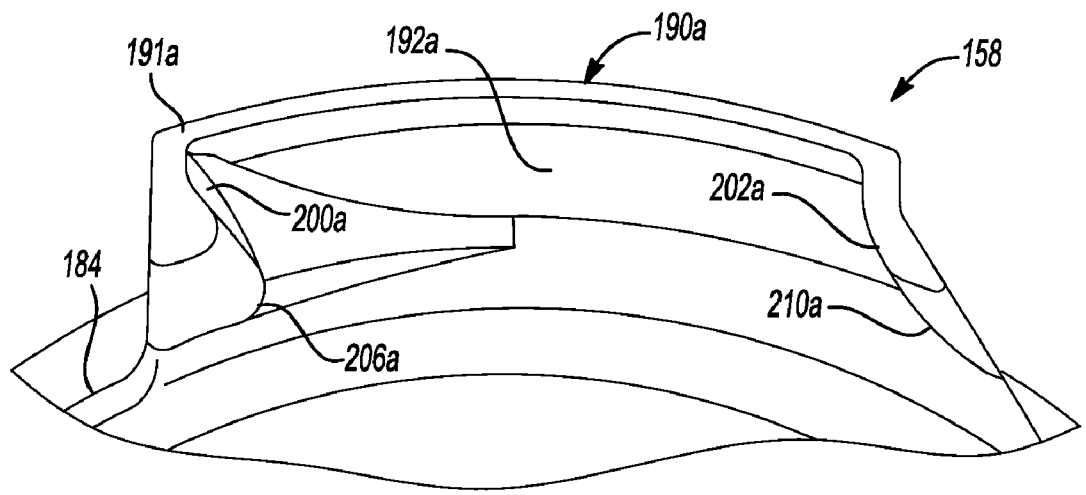
FIG. 8 is a front view of the portion of the baffle component of FIG. 7.

Referring in particular to FIGS. 6-8, baffle component 158 can have a generally annular shape including a main ring 180. Ring 180 can have a central aperture 182 formed therein and can define a perimeter 184 along the outside thereof. Aperture 182 can provide for fluid communication between field case 116 and first side 160 of fan component 156 through aperture 182. Furthermore, ring 180 can define first and second sides 186, 188. Baffle component 158 can be disposed with first side 186 facing field case 116 and second side 188 facing fan component 156 (FIG. 3).

Baffle component 158 can further include vent features 190a-d extending radially outwardly from ring 180 at perimeter 184. Baffle component 158 can include four vent features 190a, 190b, 190c, 190d evenly spaced around perimeter 184. As described in further detail below, vent features 190a-d can, in combination with gear case 118, form exhaust vents 152a-d.

Vent feature 190a will be described in further detail herein. As vent features 190b, 190c, 190d can include features corresponding to vent feature 190a, it is to be understood that the description of vent feature 190a can apply to vent features 190b, 190c, and 190d.

Vent feature 190a can be integrally formed with ring 180. Vent feature 190a can have an impact rib 191a formed on a radially outward portion thereof. Furthermore, vent feature 190a can include a plurality of surfaces. In particular, vent feature 190a can include a main surface 192a extending radially from ring 180 along perimeter 184. Main surface 192a can be axially sloped away from first side 186 of ring 180. Vent feature 190a can further include first and second side surfaces 200a, 202a. First side surface 200a can extend axially from an end of main surface 192a and can be sloped relative to a radial direction toward main surface 192a so as to face in a direction that is, in part, radially outward. First side surface 200a can further include a rounded portion 206a proximate perimeter 184. Second side surface 202a can extend axially from an opposite end of main surface 192a and can be sloped relative to a radial direction away from main surface 192a so as to face in a direction that is, in part, radially inward. Second side surface 202a can further include a rounded portion 210a proximate perimeter 184.

Figure 9:
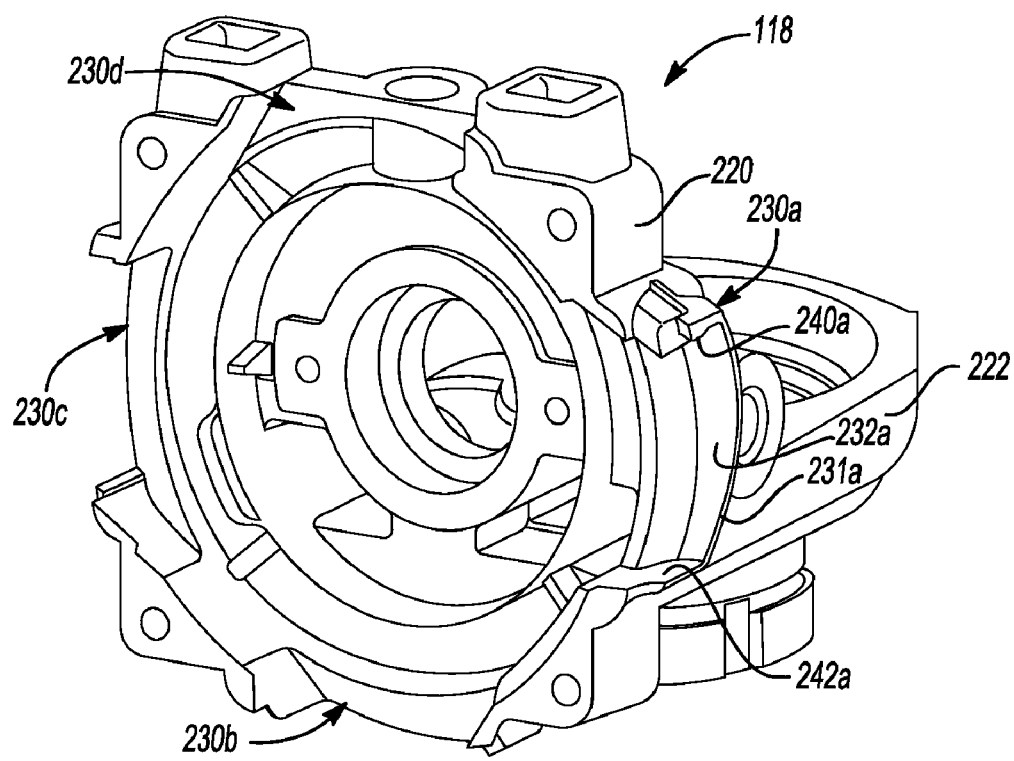
FIG. 9 is a perspective view of a portion of a gear case for a large angle grinder according to the principles of the present disclosure.
Figure 10:
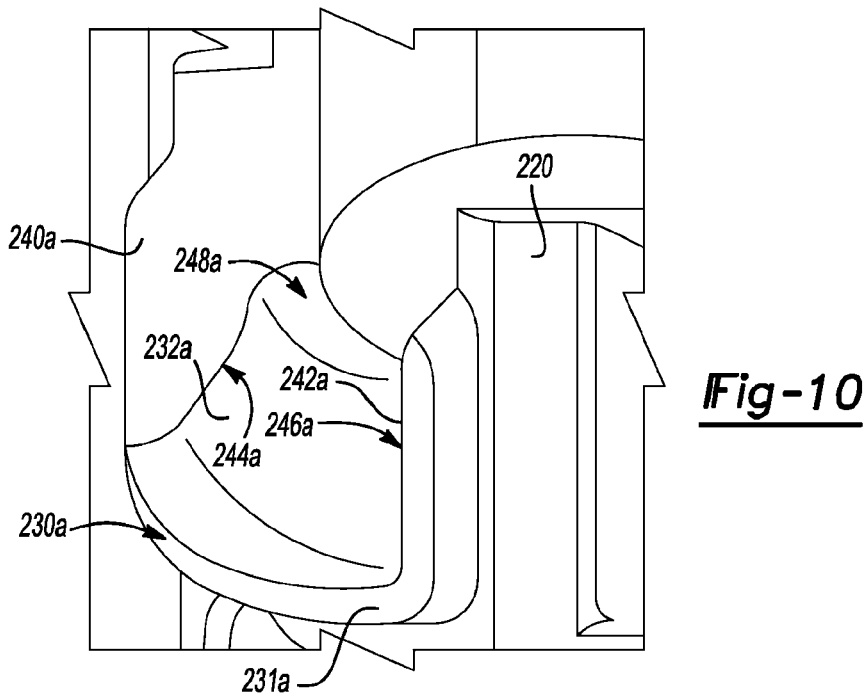
FIG. 10 is a perspective view of a vent feature portion of the gear case of FIG. 9.
Figure 11:
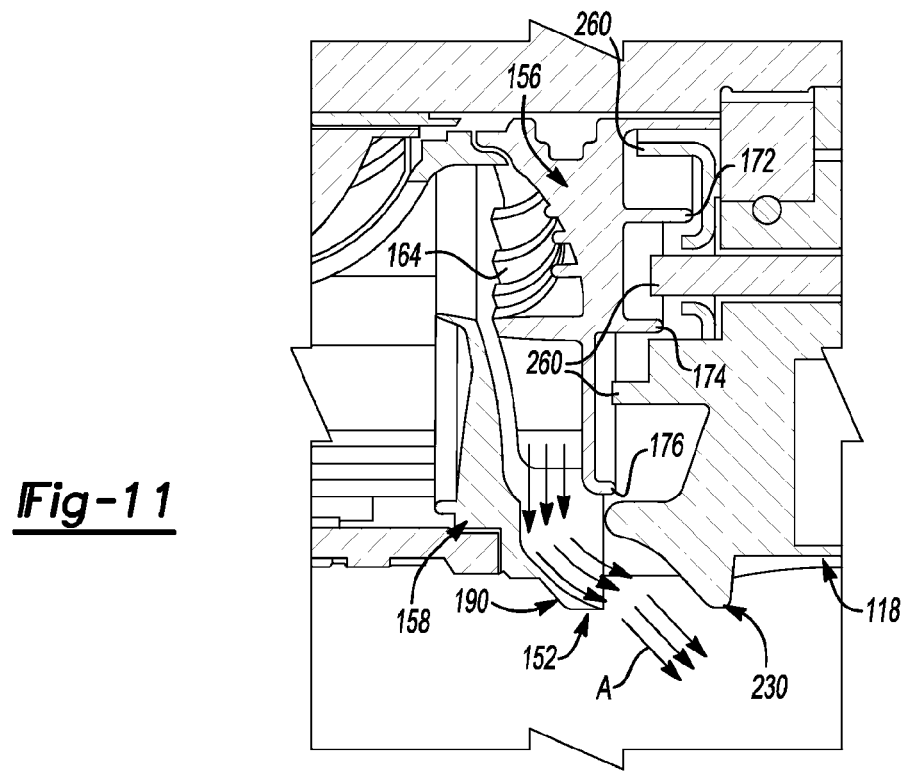
FIG. 11 is a cross sectional view of a portion of a radial fan assembly according to the principles of the present disclosure.
Figure 12:
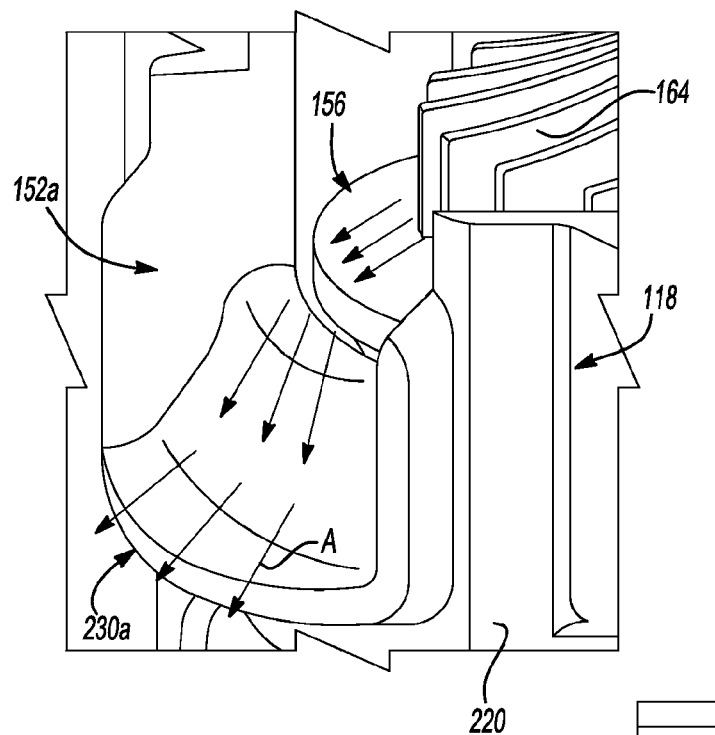
FIG. 12 is a perspective view of a portion of a radial fan assembly according to the principles of the present disclosure.

Referring in particular to FIGS. 9-10, gear case 118 can include a main part 220 and an end part 222. Main part 220 can be configured to couple gear case 118 to the field case 116. End part 222 can extend axially from main part 220 and can be configured to support wheel spindle 129 and grinder wheel 130 (FIG. 1) and associated components, as described in more detail below.

Main part 220 can include vent features 230a-d formed therein. Four vent features 230a, 230b, 230c, 230d can be evenly spaced around main part 220. As described in further detail below, vent features 230a-d can, in combination with vent features 190a-d of baffle component 158, form exhaust vents 152a-d.

Vent feature 230a will be described in further detail herein. As vent features 230b, 230c, 230d can include features corresponding to vent feature 230a, it is to be understood that the description of vent feature 230a herein can apply to vent features 230b, 230c, and 230d.

Vent feature 230a can be integrally formed with main part 220. Vent feature 230a can have an impact rib 231a formed on a radially outward portion thereof. Impact rib 231a can have a complementary shape and position with respect to impact rib 191a. Impact ribs 191a, 231a can protect exhaust vent 152a from a drop or other impact. Furthermore, vent feature 230a can have a plurality of surfaces. Vent feature 230a can have a main surface 232a extending radially from main part 220. Main surface 232a can be axially sloped toward end part 222. Vent feature 230a can further include first and second side surfaces 240a, 242a. First side surface 240a can extend axially from an end of main surface 232a, and second side surface 242a can extend axially from an opposite end of main surface 232a. Vent feature 230a can also include first and second fillet portions 244a, 246a between main surface 232a and first and second side surfaces 240a, 242a, respectively, and a third fillet portion 248a between main surface 232a and main part 220.

Main part 220 can also include projections 260 (FIG. 11) formed therein. Projections 260 can have a complementary shape and position with respect to ribs 172, 174, 176 of fan component 156.

Referring in particular to FIGS. 11-14, radial fan assembly 150 can operate to draw air through field case 116 and expel the air (represented in the Figures by the arrows labeled "A") out exhaust vents 152a-d. When fan component 156 rotates, blades 164 operate to draw air towards first side 160 of back plate 159. As fan component 156 is configured to be a radial fan, the air is exhausted radially outwardly at ends 168 of blades 164. The air is then directed axially away from handle portion 114 of LAG 100, thus axially away from a user of LAG 100, by baffle vent features 190a-d. Gear case vent features 230a-d, having a complementary shape to baffle vent features 190a-d, allow the air to be directed axially away as well as help direct the air. As shown in FIGS. 13 and 14, exhaust vents 152a-d can direct the air approximately 45° from the radial direction and approximately 20° from a direction tangent to the outer diameter of fan component 156.

Exhaust vents 152a-d are configured to allow as much air as possible therethrough. In particular, baffle vent features 190a-d include sloped side surfaces 200a-d, 202a-d which correspond to the radial path of the exhausted air. Accordingly, baffle vent features 190a-d can allow for a large air flow therethrough. Additionally, fan component 156 can be positioned relative to gear case 118 so that first side 160 of back plate 159 is closer to handle portion 114. Therefore, radial fan assembly 150 can operate with a relatively high efficiency, as there is minimum recirculation and high and low pressure zones can be prevented from forming and causing degradation in performance.

Furthermore, according to the principles of the present disclosure, various features of radial fan assembly 150 inhibit whistling noise from being produced during operation. The production of whistling noise by blades 164 can be reduced by providing a radial gap between radially outward ends 168 of blades 164 and any other component of radial fan assembly 150 and LAG 100, the gap being sized approximately 7-8% of the diameter of back plate 159. Such a gap can be provided by outside area 166 on first side 160 of back plate 159 or otherwise by the configuration of radial fan assembly 150. Furthermore, rounded positions 206 of baffle vent features 190a-d and the fillet portions of gear case vent features 230a-d can inhibit production of whistling noise at these positions. Additionally, as fan component 156 is positioned with first side 160 of back plate 159 away from gear case 118, the production of whistling noise between fan component 156 and gear case vent features 230a-d can be reduced.

Additionally, ribs 172, 174, 176 of fan component 156 and complementary projections 260 on main part 220 of gear case 118 can inhibit dust and other particles from traveling proximate first side 160 of fan component 156 from gear case 118 and being expelled out exhaust vents 152a-d. When radial fan assembly 150 is assembled, these features can overlap and create an undulating path therebetween. As the circulation of air with gear case 118 is inhibited as described above, it can be difficult for dust and other particles to navigate such an undulating path.

According to the principles of the present disclosure, a radial fan assembly can vary in many ways. A radial fan assembly can include a variety of components including but not limited to those disclosed herein. The components of a radial fan assembly according to the principles of the present disclosure can have a variety of configurations. It is to be understood that the components are not limited to the exemplary configurations disclosed in detail herein. Furthermore, the components of a radial fan assembly according to the principles of the present disclosure can each include a variety of relatively rigid materials as is well understood in the art.

Brush Card Assembly

As described in detail below, LAG 100 can include a brush card assembly 270 for supporting a motor brush 272 (FIGS. 15-20) proximate motor 124. Accordingly, details of motor 124 are first discussed.

Motor 124 can be a universal series motor of a type commonly known in the art. With particular reference to FIG. 2, motor 124 generally includes a motor spindle 280, a motor armature 282, a field pole 284, field windings 286, and a commutator 288. As is described in further detail below, electrical leads (not shown) can be included for linking motor brush 272 to switch mechanism 126 for selective connection with a power source (not shown).

Field case 116 can have a generally cylindrical shape supporting field pole 284. Field windings 286 are formed from repetitive windings of wire disposed on either side of field pole 284. Power from the power source runs through a portion of field windings 286 creating an electric field for causing rotation of motor armature 282.

Motor armature 282 can be fixed for rotation with motor spindle 280. Motor spindle 280 is supported by a bearing (not shown) proximate first end 120 of field case 116, through commutator 288. Another bearing (not shown) seats within gear case 118 for supporting an opposite end of the motor spindle 280.

Commutator 288 is fixed for rotation with motor spindle 280 and provides an electrical connection between the rotating motor armature 282 and stationary motor brush 272. Generally, the stationary motor brush 272 is held in contact with commutator 288 by spring tension (as will be discussed in detail hereinbelow). Motor brush 272 completes the electrical link between the rotating commutator 288, motor armature 282, and switch mechanism 126.

Figure 15:
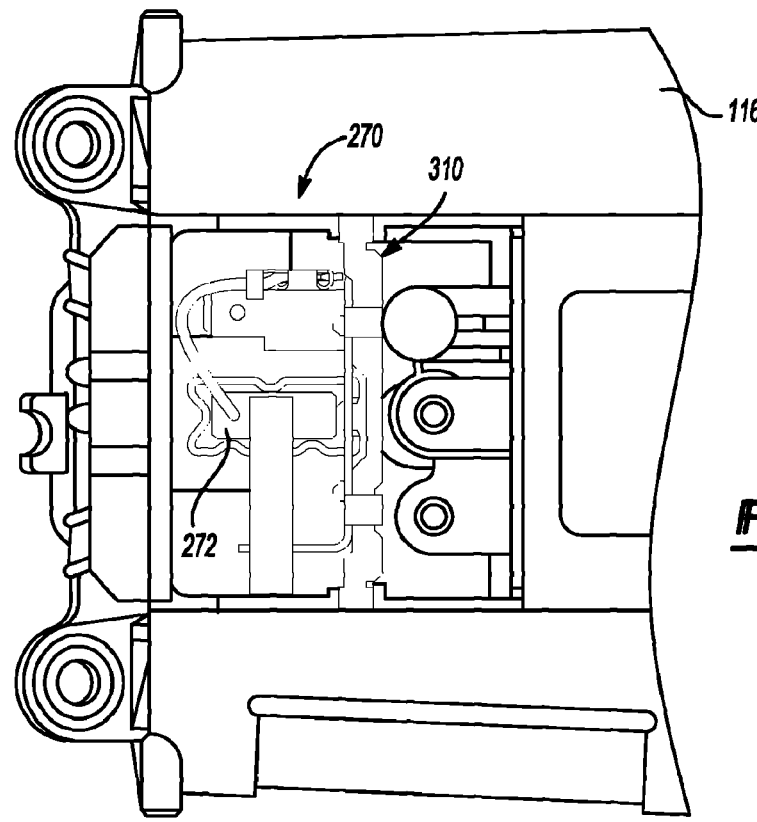
FIG. 15 is a side view of a brush card assembly for a large angle grinder according to the principles of the present disclosure.
Figure 16:
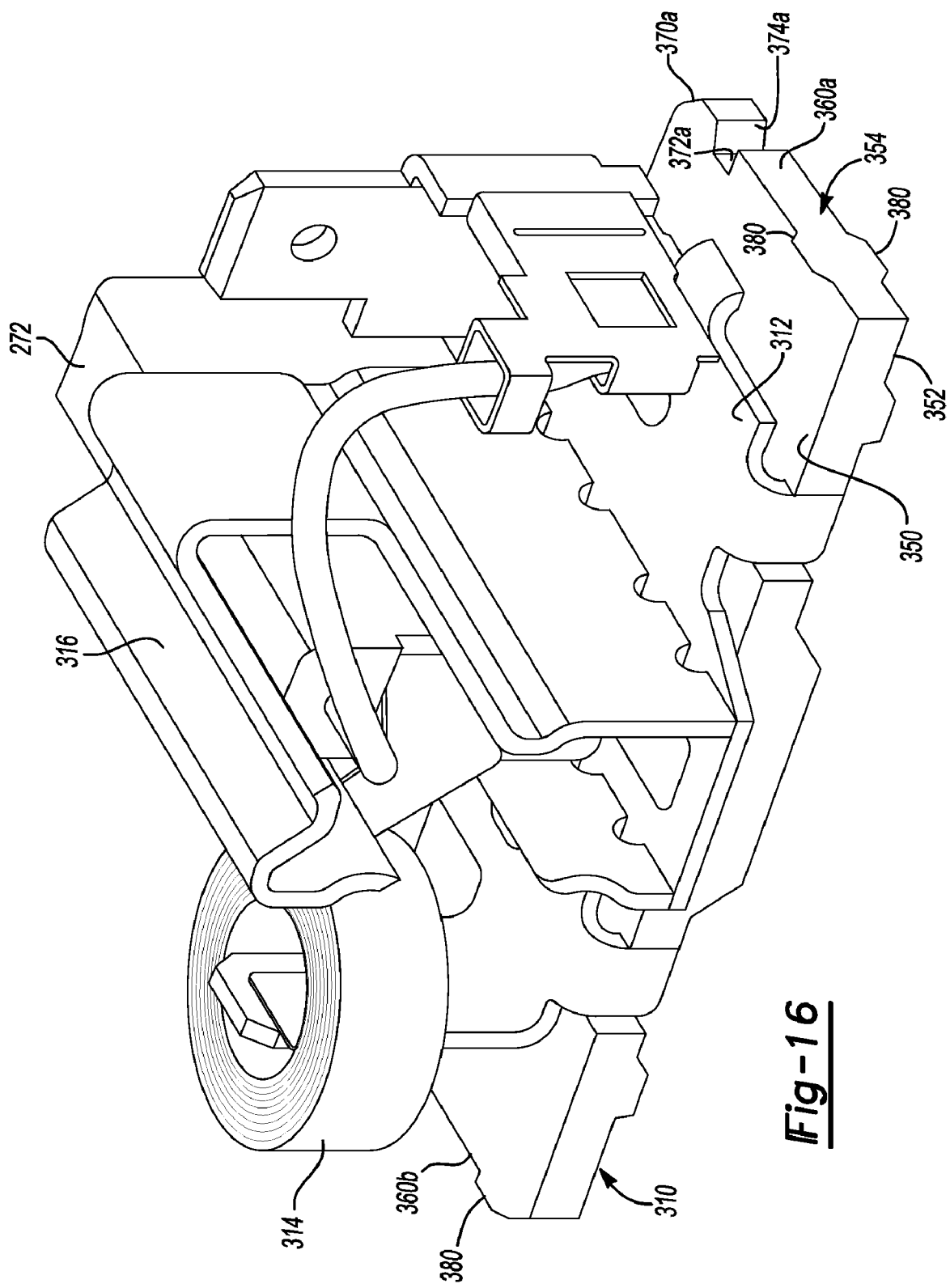
FIG. 16 is a perspective view of a brush card and associated components for a large angle grinder according to the principles of the present disclosure.

Referring to FIGS. 15-22, LAG 100 can include brush card assembly 270. Brush card assembly 270 can include a brush card 310 configured to engage with field case 116. As shown in FIG. 16, brush card 310 can support a variety of components including a mounting plate 312 directly coupled to brush card 310, and a brush spring 314 and a brush box 316 attached to mounting plate 312. Motor brush 272 can be disposed within brush box 316. These components interact with motor 124 during operation of LAG 100. For example, brush spring 314 can bias motor brush 272 in contact with commutator 288.

Figure 17:
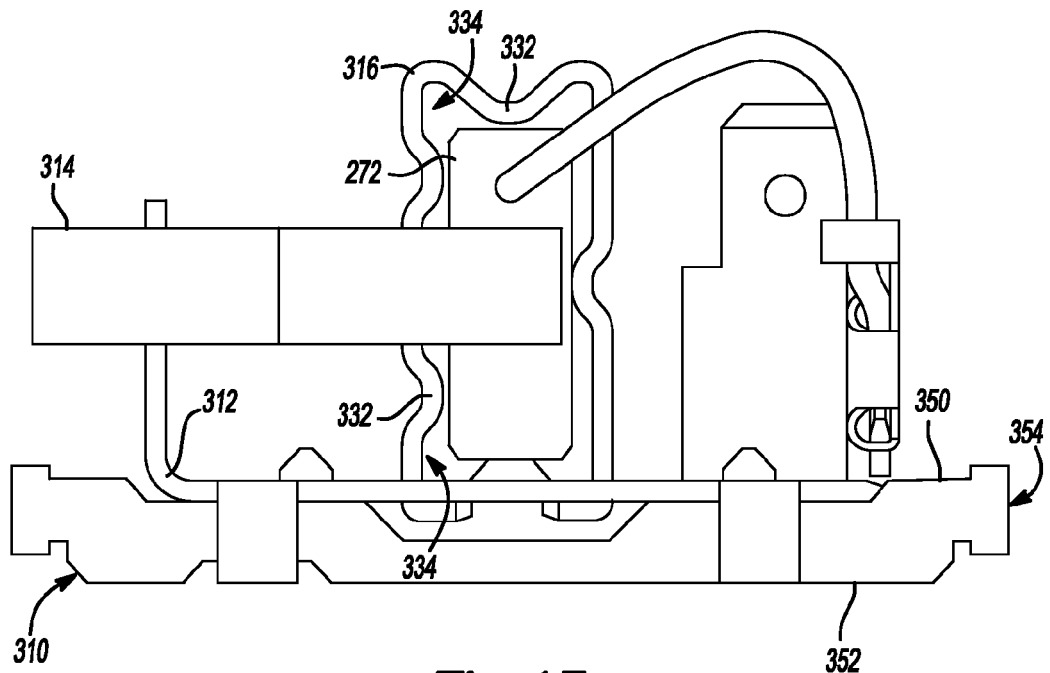
FIG. 17 is an end view of the brush card and associated components of FIG. 16.
Figure 18:
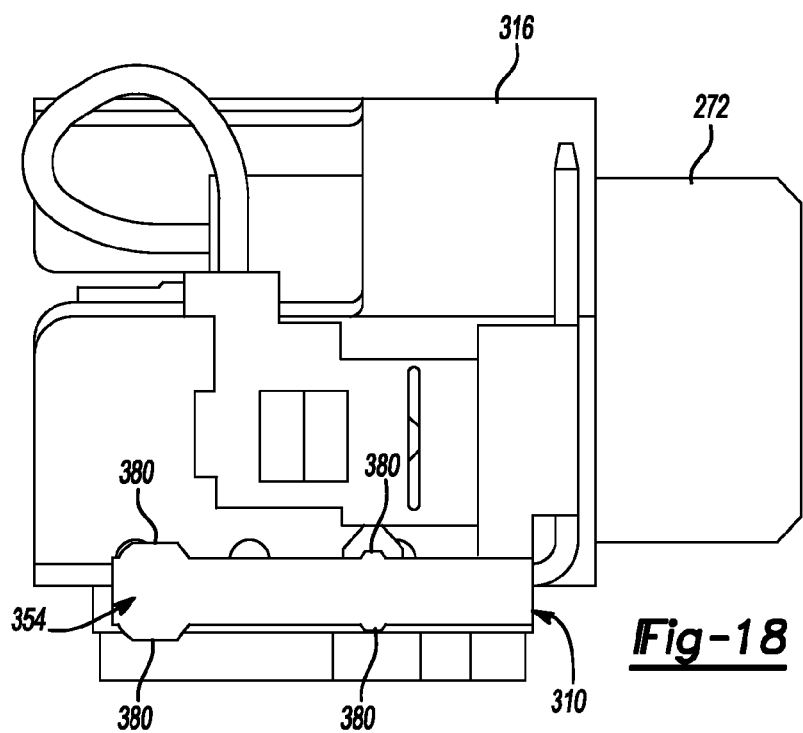
FIG. 18 is a side view of the brush card and associated components of FIG. 16.
Figure 19:
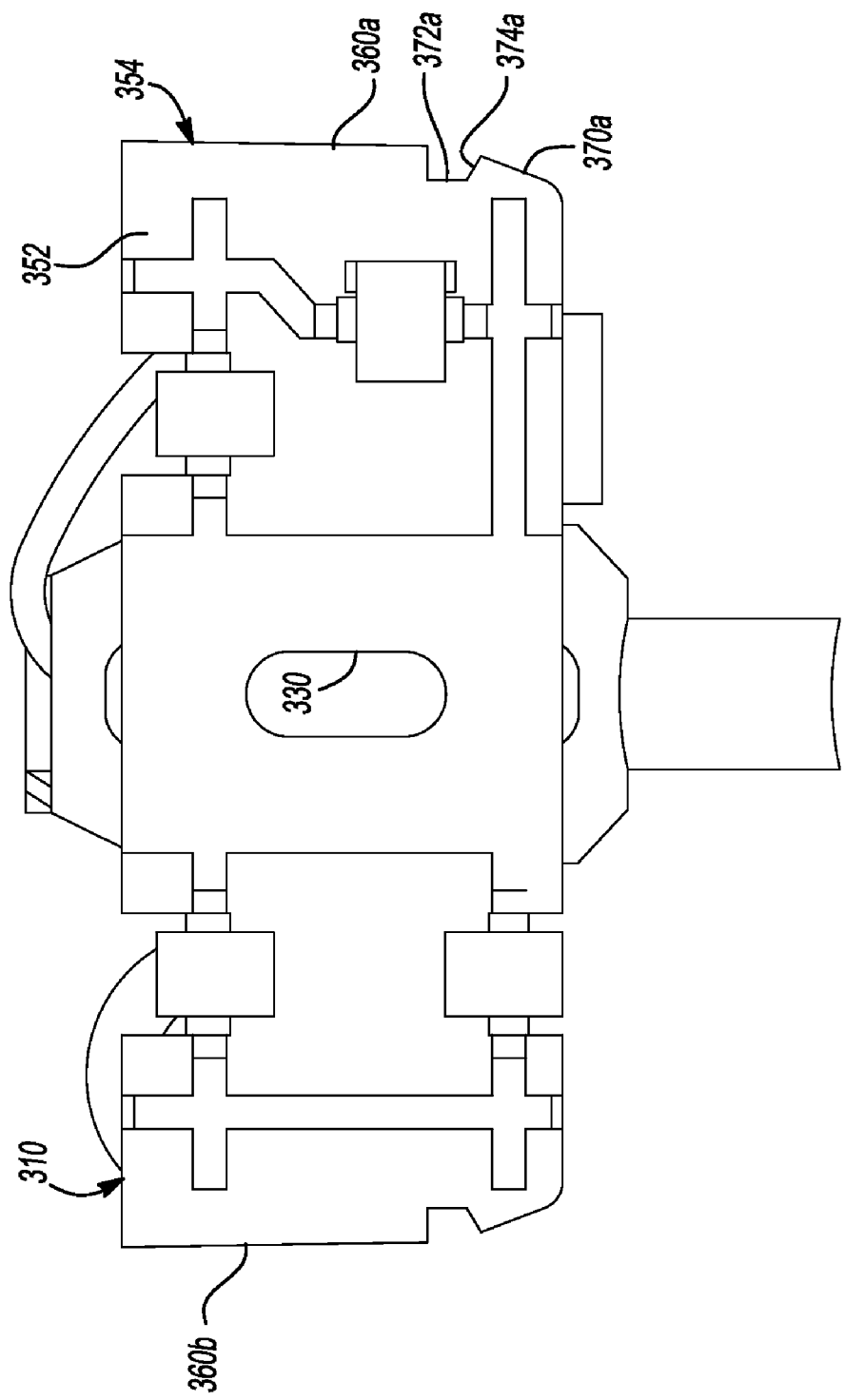
FIG. 19 is a bottom view of the brush card and associated components of FIG. 16.

As shown in FIG. 19, brush card 310 can further include an aperture 330 therethrough proximate brush box 316 and motor brush 272. Additionally, as shown in FIG. 17, brush box 316 can include radially inwardly extending rounded projections 332 which contact motor brush 272 and provide spaces 334 between brush box 316 and motor brush 272. Aperture 330 and spaces 334 can provide for cooling of the components and can help inhibit particle buildup during operation of LAG 100 and, therefore, can help improve the efficiency of LAG 100.

Referring in particular to FIGS. 16-19, brush card 310 can have a generally rectangular shape including a first or top surface 350, a second or bottom surface 352, and outside surface 354 extending therebetween. Top and bottom surfaces 350, 352 can include a variety of features for coupling the components of brush card assembly 270 discussed above. Furthermore, surfaces 350, 352, 354 can include features facilitating the engagement and securing of brush card 310 and field case 116, as described in more detail below.

Outside surface 354 can include sides 360, more particularly opposing sides 360a, 360b. Side 360a can include a first sloped portion 370a and a recess 372a. First sloped portion can extend from a corner of outside surface 354 along side 360a. Recess 372a can be adjacent first sloped portion 370a and can further include second sloped portion 374a. Second sloped portion 374a can be sloped in the opposite direction relative to first sloped portion 370a. Side 360b can include features corresponding to side 360a and, therefore, will not be described in further detail herein. Additionally, brush card 310 can include projections 380 extending outwardly therefrom proximate opposing sides 360a, 360b.

Figure 20:
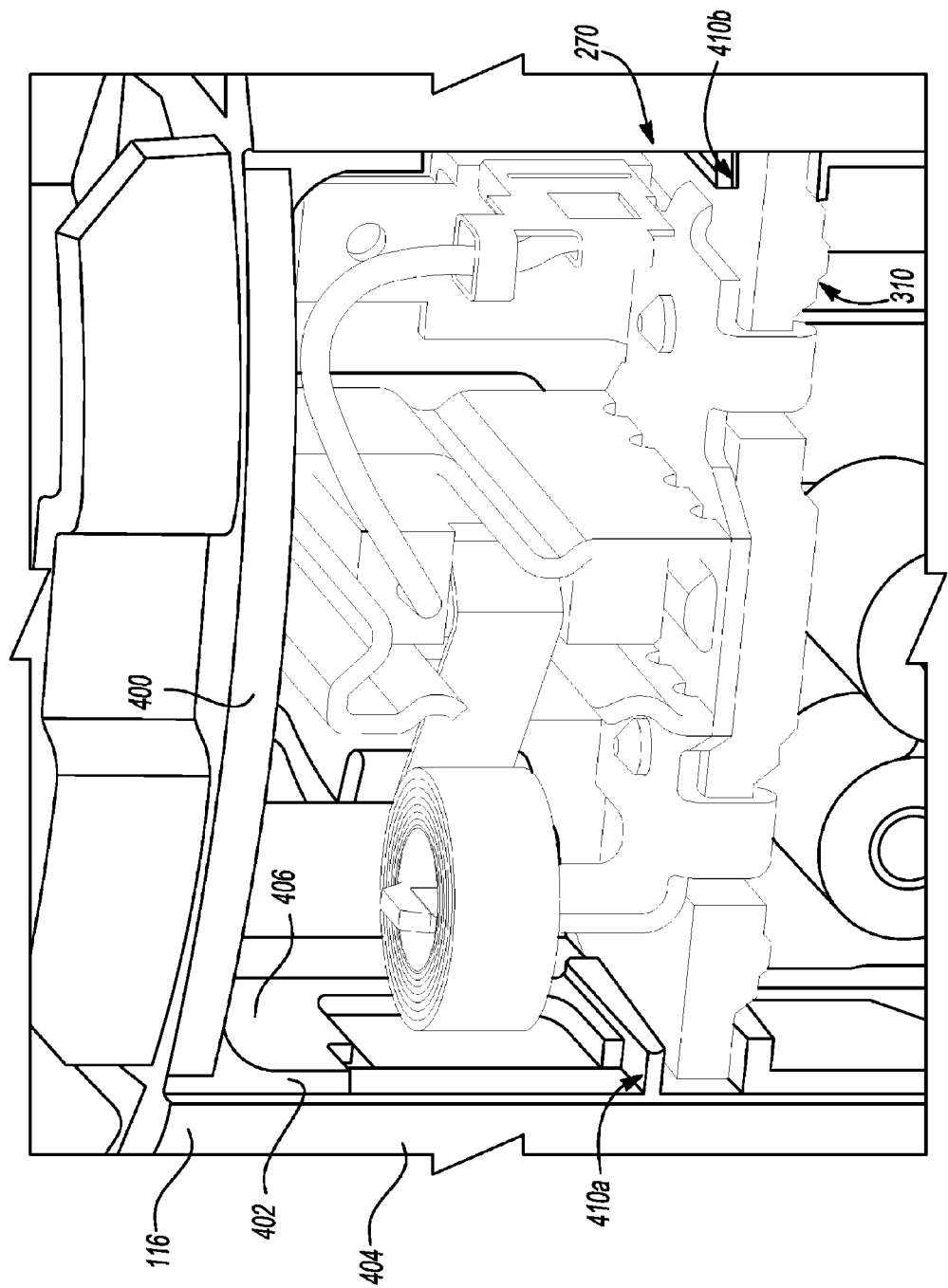
FIG. 20 is a perspective view of the brush card assembly of FIG. 15.
Figure 21:
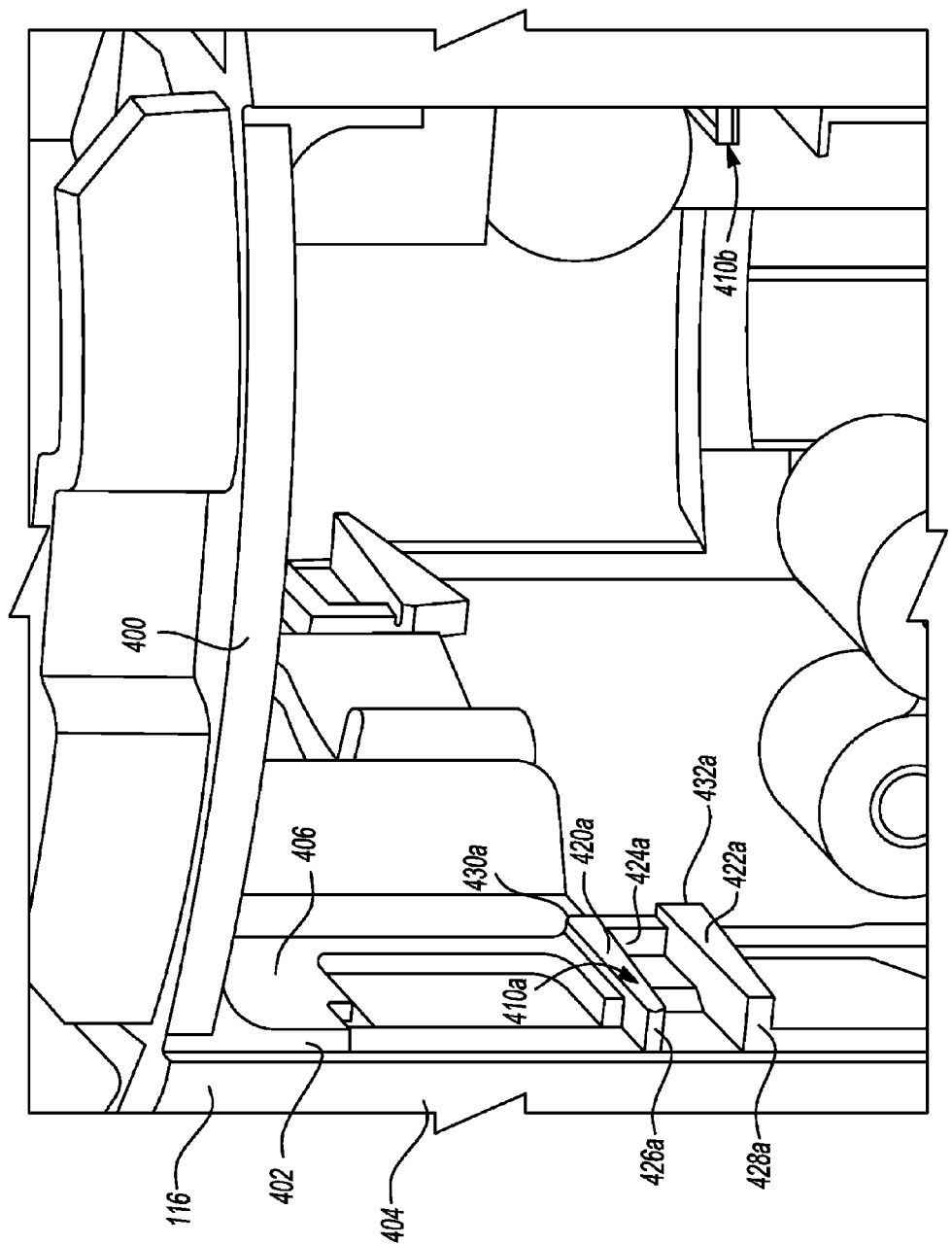
FIG. 21 is a perspective view of a field case for a large angle grinder according to the principles of the present disclosure.
Figure 22:
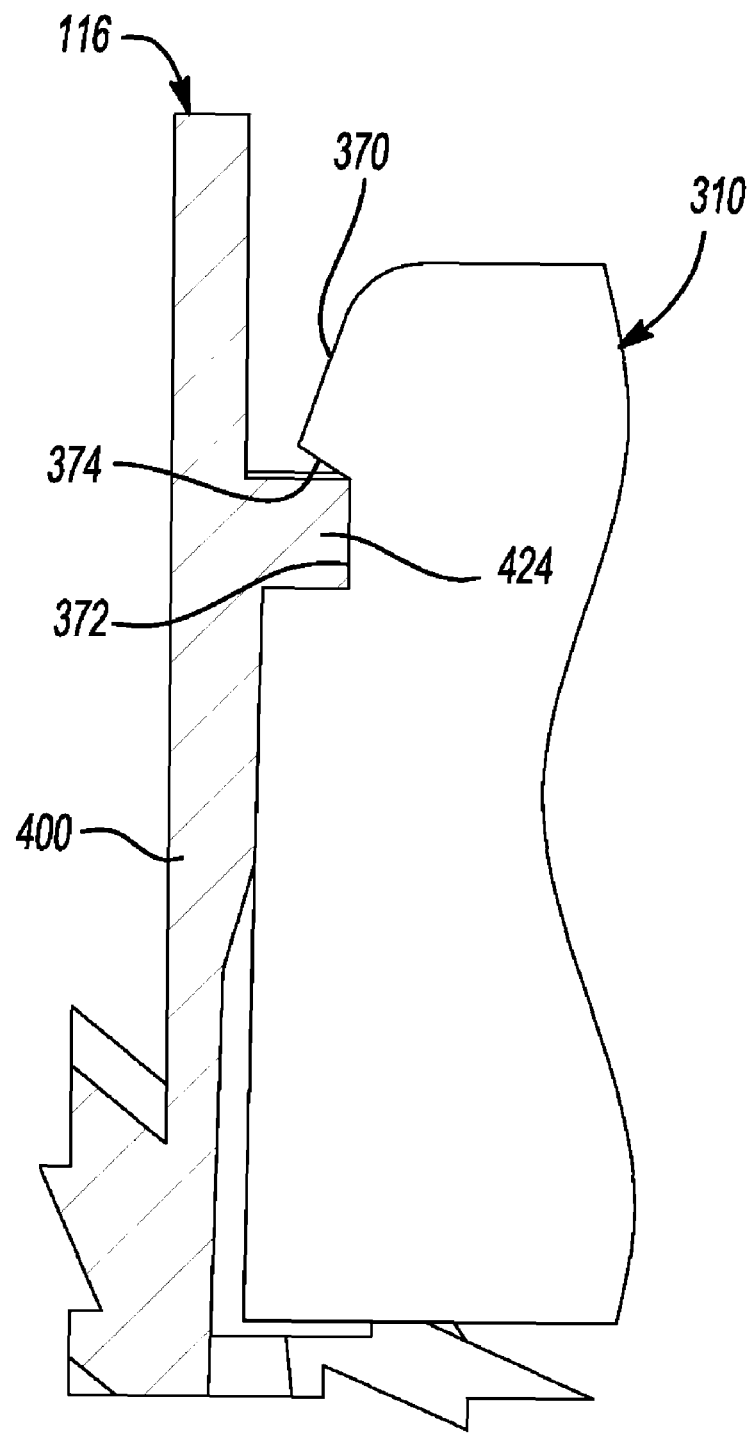
FIG. 22 is a cross sectional view of a portion of the brush card assembly of FIG. 15.
Figure 23:
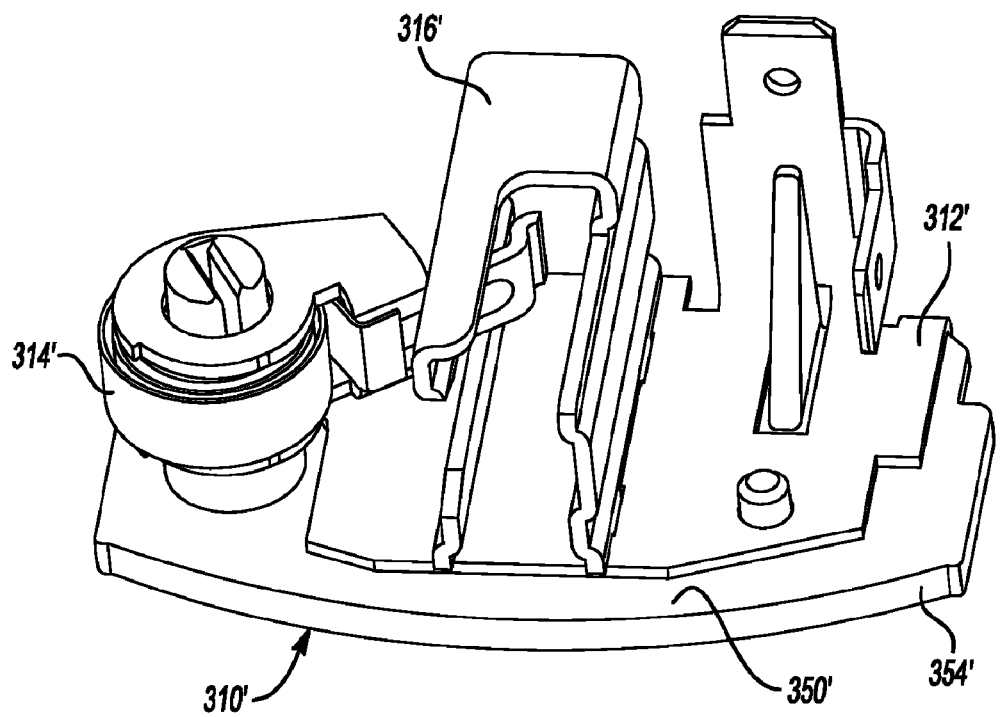
FIG. 23 is a perspective view of another brush card and associated components according to the principles of the present disclosure.
Figure 24:
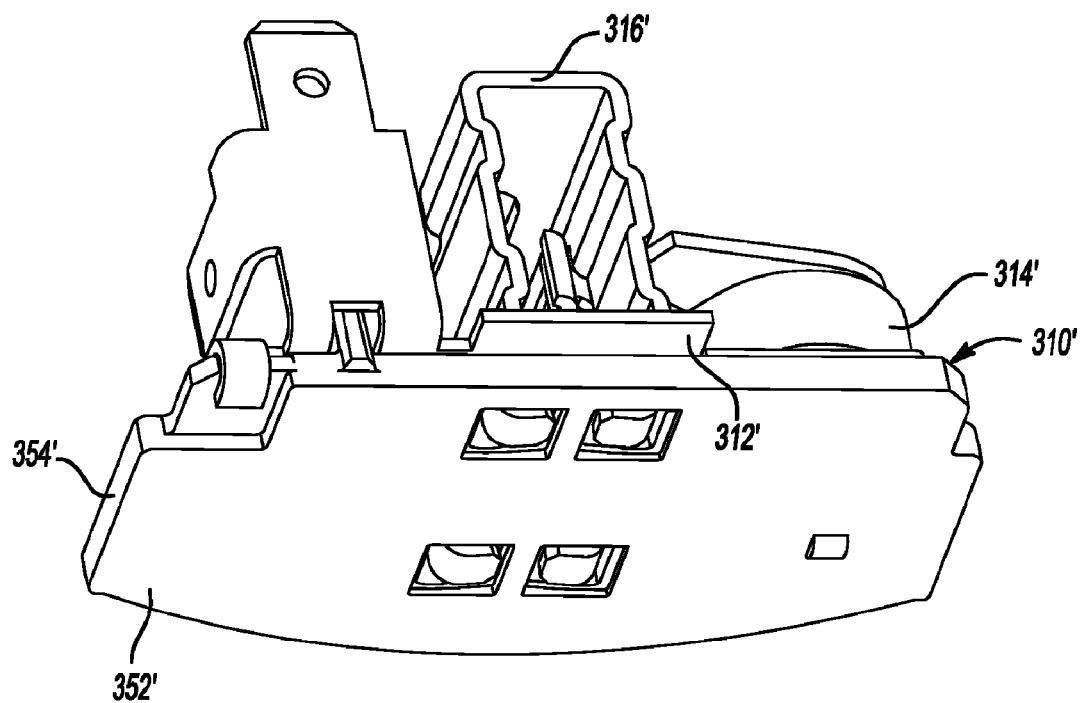
FIG. 24 is another perspective view of the brush card and associated components of FIG. 23.
Figure 25:
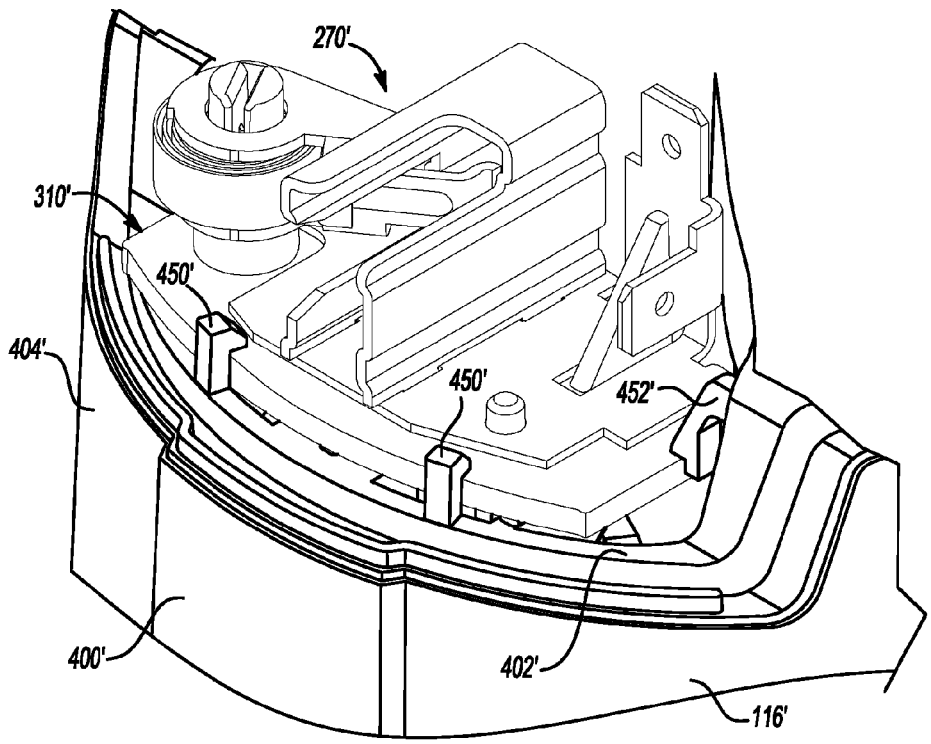
FIG. 25 is a perspective view of another brush card assembly according to the principles of the present disclosure.
Figure 26:
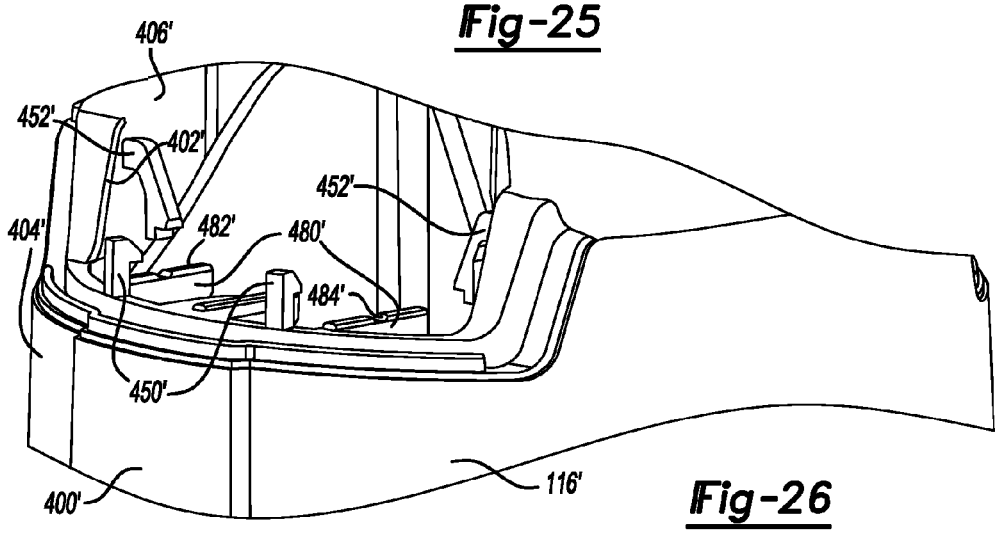
FIG. 26 is a perspective view of another field case according to the principles of the present disclosure.

Brush card assembly 270 can also include field case 116. Referring in particular to FIGS. 15 and 20-21, field case 116 can have a generally cylindrical shape and can include a main body 400. Main body 400 can have an aperture 402 defined therein between an outside surface 404 and an inside surface 406 thereof. Aperture 402 can be configured to allow assembly of brush card 310 and associated components therethrough.

Main body 400 can also include a pair of guides 410a, 410b extending from inside surface 406 proximate aperture 402. Guide 410a can be located on a predetermined position of main body 400 and can include first and second elongate support segments 420a, 422a and a connecting segment 424a extending therebetween, as shown in FIG. 21. Support segments 420a, 422a and connecting segment 424a can be integrally formed with main body 400. First ends 426a, 428a of support segments 420a, 422a respectively can be disposed proximate aperture 402. Connecting segment 424a can extend between second ends 430a, 432a of support segments 420a, 422a opposite first ends 426a, 428a. Support segments 420a, 422a can extend parallel to each other and in a direction perpendicular to an axial direction. Guide 410b can include features corresponding to guide 410a and, therefore, will not be described in further detail herein.

Brush card 310 and field case 116 can engage with each other to form brush card assembly 270 and, thereby, secure brush card 310 to field case 116. In particular, the interface between guides 410, sides 360, and projections 380 can provide for the engagement and securing of brush card 310 and field case 116. Sides 360 of brush card 310 can be disposed between support segments 420, 422 of guides 410. First sloped surfaces of sides 360, 362 can engage connecting segments 424, and main body 400 of field case 116 can elastically deform in correspondence with such engagement. Brush card 310 can be inserted into main body 400 relative to guides 410, 412 until the recesses of sides 360, 362 engage with the connecting segments and main body 400 returns to its original shape. Projections 380 of brush card 310 can engage with the support segments and can position brush card 310 relative to the support segments. Additionally, the second sloped surfaces of sides 360, 362 can bias brush card 310 into maintaining engagement with guides 410, 412.

Referring to FIGS. 23-28, an alternately configured brush card assembly 270' can include a brush card 310'. Brush card 310' can have a mounting plate 312' attached thereto, and mounting plate 312' can support a brush spring 314' and a brush box 316'. Brush box 316' can support a motor brush (not shown).

Brush card 310' can have a generally rectangular shape. Brush card 310' can include a first or top surface 350' or a second or bottom surface 352'. Furthermore, brush card 310' can include an outside surface 354' defined between top and bottom surfaces 350', 352'. As shown in FIGS. 23-28, a portion of outside surface 354' can have a curved shape.

Brush card assembly 270' can further include a field case 116'. Field case 116' can have a main body 400'. Main body 400' can have an aperture 402' therein and can define an outside surface 404' and an inside surface 406'. Aperture 402' can be configured to receive brush card 310' and the components associated therewith.

Main body 400' of field case 116' can also include a pair of front coupling arms 450' and a pair of side coupling arms 452' extending from inside surface 406'. Front coupling arms 450' can include main portions 460', flange portions 462' extending inwardly from main portions 460', and sloped portions 464' extending between main portions 460' and flange portions 462'. Similarly, side coupling arms 452' can include main portions 470', flange portions 472' extending inwardly from main portions 470', and sloped portions 474' extending between main portions 470' and flange portions 472'. Additionally, side coupling arms 452' can have connecting portions 476' extending inwardly from inside surface 406' of main body 400', and sloped portions 474' can further extend between main portions 470' and connecting portions 476'.

Furthermore, main body 400' of field case 116' can include supports 480' extending inwardly from inside surface 406' proximate aperture 402'. As shown in the Figures, main body 400' can include three supports 480'. It should be understood that, according to the principles of the present disclosure, main body 400' can include two or more supports 480'. Supports 480' can have top surfaces 482' extending complementarily to each other. Top surfaces 482' can have recess features 484' defined therein.

Figure 27:
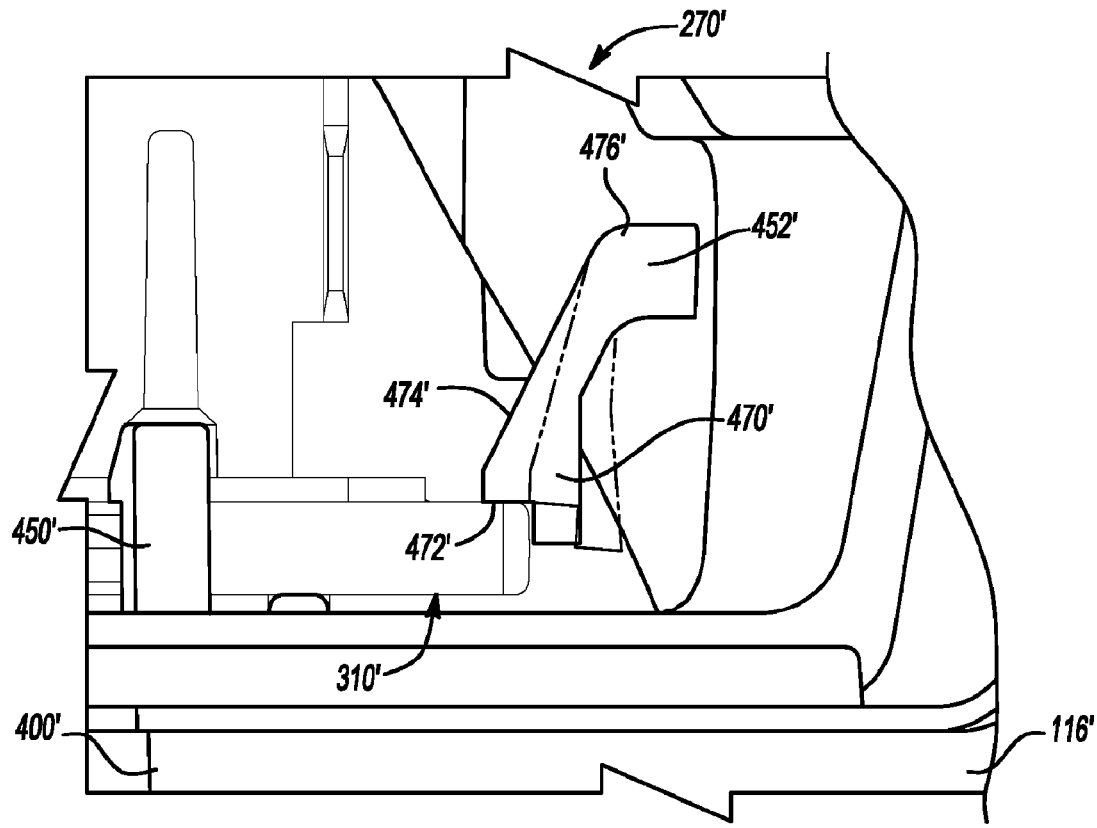
FIG. 27 is front view of a portion of the brush card assembly of FIG. 25.
Figure 28:
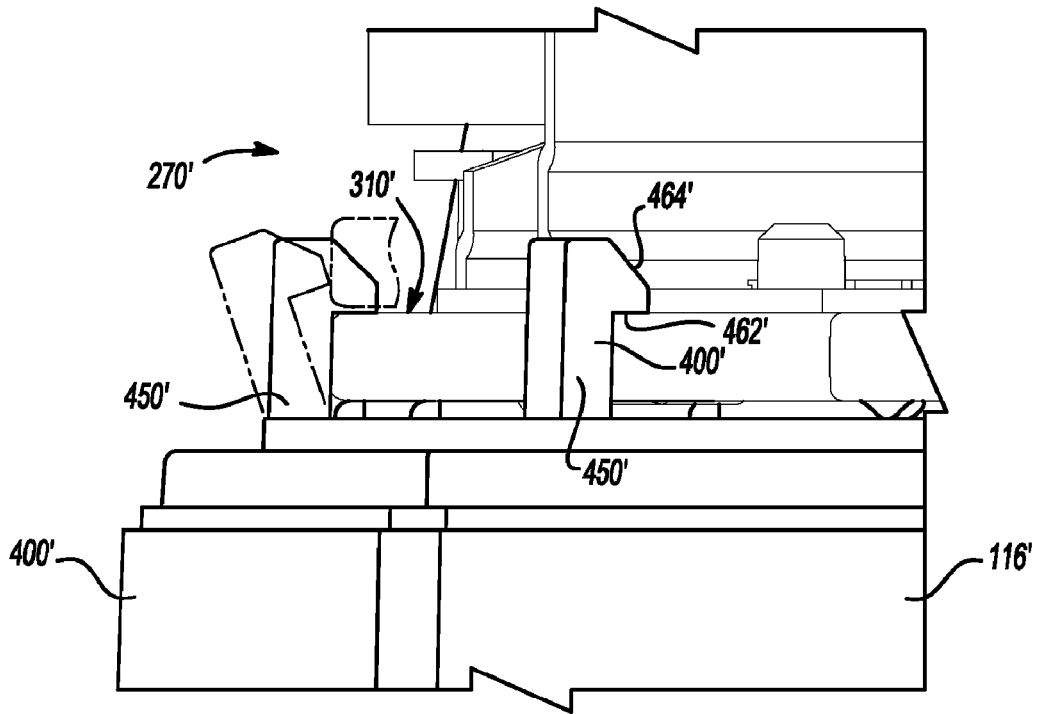
FIG. 28 is side view of a portion of the brush card assembly of FIG. 25.

Brush card 310' can engage main body 400' of field case 116' to form brush card assembly 270'. The interface between brush card 310' and field case 116' can secure brush card 310' and field case 116'. Brush card 310' can be inserted into aperture 402' of main body 400' and can engage with sloped portions 464', 474' of coupling arms 450', 452'. Referring in particular to FIGS. 27 and 28, coupling arms 450', 452' can elastically deform to allow brush card 310' to engage with main body 400'. Specifically, coupling arms 450', 452' can deflect outwardly when outside surface 354' of brush card 310' engages sloped portions 464', 474'. Coupling arms 450', 452' can return to their original positions when outside surface 354' of brush card 310' engages main portions 460', 470' and top surface 350' engages flange portions 462', 472'. Furthermore, bottom surface 352' of brush card 310' can engage with top surfaces 482' of supports of 480'. Specifically, bottom surface 352' of brush card 310' can have complementary features to recess features 484'. Accordingly, the interface of brush card 310' and main body 400' can secure brush card 310' to field case 116'.

A brush card assembly according to the principles of the present disclosure can vary in a number of ways. Brush cards according to the present disclosure can have a variety of configurations not limited to those disclosed therein. Field cases according to the present disclosure can have a variety of configurations not limited to those disclosed herein. For example, field cases can include a varied number of guides and coupling arm features. Furthermore, guide features and coupling arm features of field cases can have a variety of shapes and configurations. These features can also be positioned in a number of ways. Components of brush card assemblies according to the present disclosure can be made of a variety of relatively rigid materials well-known in the art.

It is to be understood that large angle grinders and other power tools according to the principles of the present disclosure can include brush card assemblies which have more than one brush card and associated motor brush. Specifically, a brush card assembly according to the principles of the present disclosure can have two brush cards and two associated motor brushes therewith on opposite sides of a motor. It should be understood that the features described herein with regard to individual brush card assemblies can apply to brush card assemblies having multiple brush cards and motor brushes.

Spindle Lock

LAG 100 can include a spindle lock mechanism 500 for inhibiting rotation of motor spindle 280 and associated components to enable grinder wheel 130 or another attachment to be removed and/or replaced. As such, components associated with grinder wheel 130 and motor spindle 280 will be first discussed.

LAG 100 can include a gearset 510 disposed within gear case 118 for translating rotational motion of motor spindle 280 to wheel spindle 129. Wheel spindle 129 extends generally perpendicular to motor spindle 280. Gearset 510 generally includes a pinion gear 512 and a main gear 514. Pinion gear 512 is fixed for rotation with motor spindle 280, which is rotatably driven by motor 124. Main gear 514 is fixed for rotation with wheel spindle 129 and is driven by pinion gear 512. Typically, main gear 514 is in the form of a bevel gear, and pinion gear 512 has a generally frusto-conical shape.

Both pinion gear 512 and main gear 514 can be sized according to a desired amount of torque transmission and a desired gear ratio. The higher the torque transmission that is required, the larger gearset 510 must be, specifically, pinion gear 512. To reduce overall manufacturing costs, tool weight and tool efficiency, it is desirable to provide a gearset 510 that is minimal in size and weight while maximizing the amount of torque transmittable therethrough.

As previously discussed, grinder wheel 130 is selectively fixed for rotation with wheel spindle 129. As shown in FIG. 2, grinder wheel 130 is received onto wheel spindle 129 and may be secured thereto by a nut 520. Grinder wheel 130 may be removed for several reasons, including LAG 100 maintenance, replacement of a broken or worn grinder wheel 130, or exchanging the type of grinder wheel 130 used (e.g. fine, coarse). Wheel guard 132 is attachable to gear case 118 for protecting an operator from the spinning grinder wheel 130. Wheel guard 132 covers an arcural portion of grinder wheel 130 and is adjustable about grinder wheel 130. Additionally, grinder wheel 130 sizes may vary and therefore each size can require a corresponding wheel guard 132.

Figure 29:
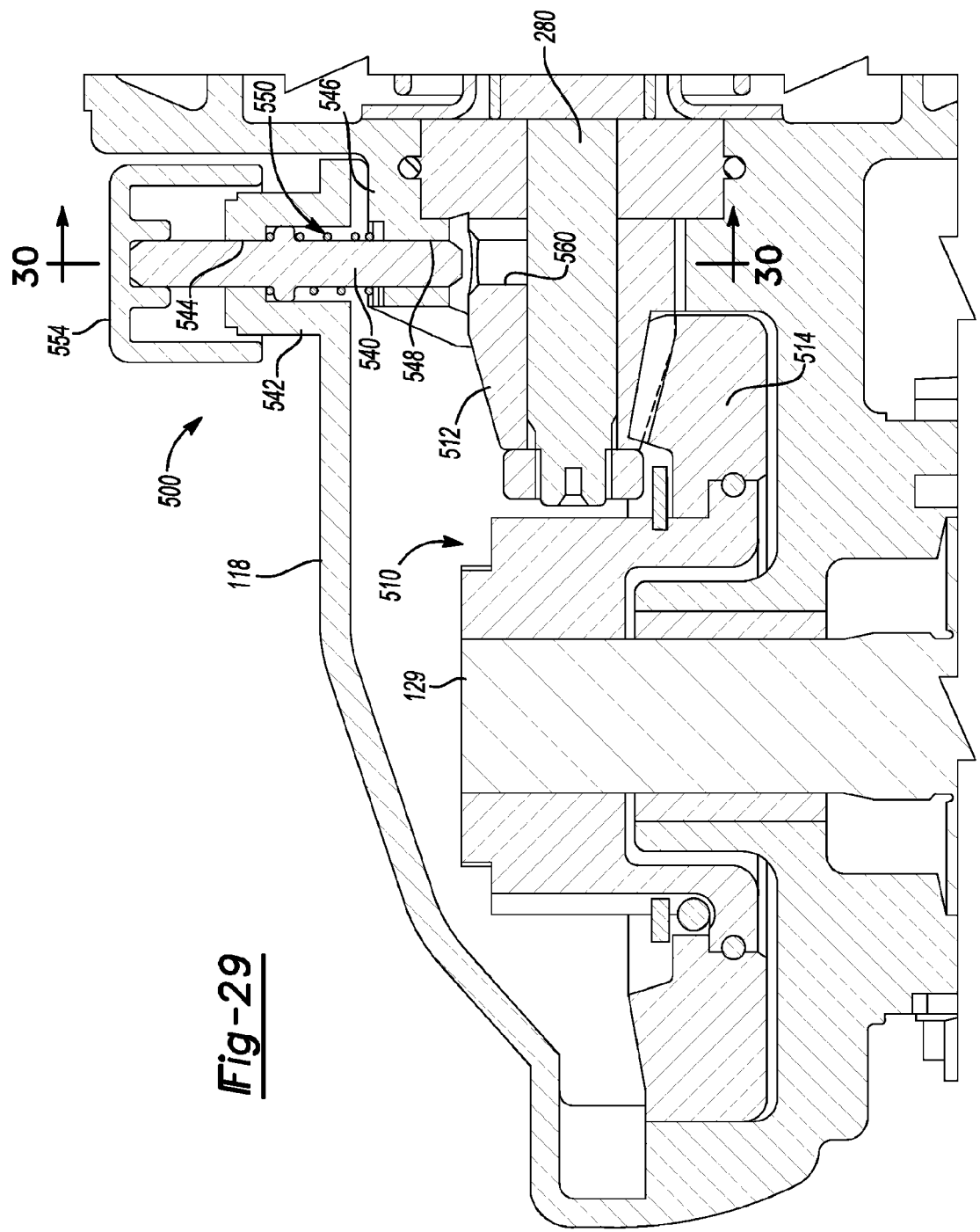
FIG. 29 is cross sectional view of a front portion of a large angle grinder including a spindle lock assembly according to the principles of the present disclosure.
Figure 30:
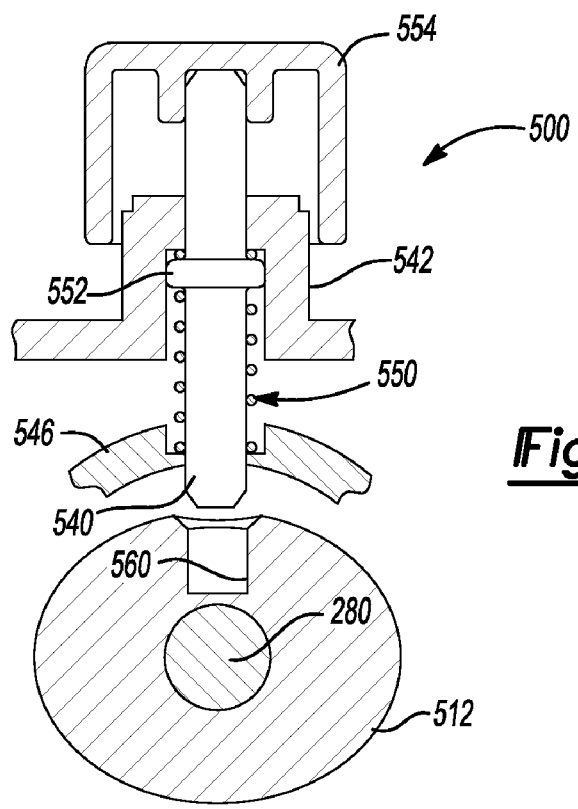
FIG. 30 is a partial cross sectional view of the spindle lock assembly of FIG. 29 in a disengaged position.
Figure 31:
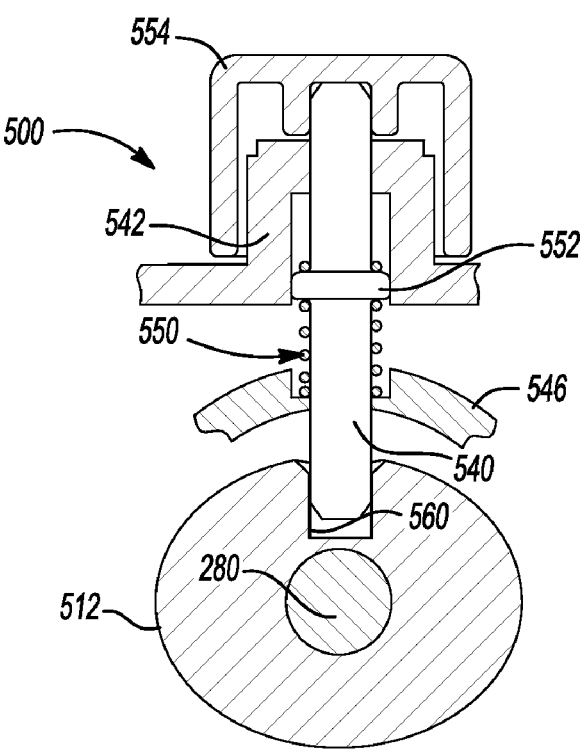
FIG. 31 is a partial cross sectional view of the spindle lock assembly of FIG. 29 in an engaged position.

Referring to FIGS. 29-31, LAG 100 can include spindle lock mechanism 500 to inhibit the rotation of motor spindle 280 and wheel spindle 129 so that grinder wheel 130 can be removed and replaced. Spindle lock mechanism 500 can include a pin 540. Spindle lock mechanism 500 can also include a projection 542 extending outwardly from gear case 118. Projection 542 can be integrally formed with gear case 118 with an aperture 544 extending therethrough. Spindle lock mechanism 500 can also include an inner flange 546 of gear case 118 with an aperture 548 therethrough. Pin 540 can extend between projection 542 and inner flange 546 through apertures 544, 548. Furthermore, spindle lock mechanism 500 can include a biasing member 550 disposed around pin 540 between projection 542 and inner flange 546. Biasing member can engage a flange 552 of pin 540 as well as opposing surfaces of projection 542 and inner flange 546. Spindle lock mechanism 500 can also have a button component 554 disposed on an end of pin 540 outside of gear case 118 configured to be engaged by a user of LAG 100. Additionally, spindle lock mechanism 500 include pinion gear 512, which can have an aperture 560 defined therein. Aperture 560 can be configured to receive pin 540. Furthermore, pinion gear 512 can be configured to have an elliptical cross section, such as shown FIGS. 30 and 31.

Spindle lock mechanism 500 is normally at a disengaged position, shown in FIGS. 29 and 30. In the disengaged position, biasing member 550 positions pin 540 away from pinion gear 512. Accordingly, pinion gear 512 can rotate, and motor 124 can transfer rotational motion to grinder wheel 130 through motor spindle 280, main gear 514 and wheel spindle 129. With an elliptical cross section, pinion gear 512 can help prevent undesired engagement of pin 540 and aperture 560 during rotation of pinion gear 512, as the wider ends of pinion gear 512 can deflect pin 540 away before it can engage aperture 560.

When pinion gear 512 is not rotating, spindle lock mechanism 500 can be operated to engage pin 540 with aperture 560, as shown in FIG. 31. To operate spindle lock mechanism 500, a user of LAG 100 depresses button component 554 and forces pin 540 into engagement with aperture 560. Such engagement prevents rotation of pinion gear 512 and, thus, operation of LAG 100. Accordingly, grinder wheel 130 can be safely removed and replaced from wheel spindle 129. When grinder wheel 130 has been replaced the user of LAG 100 can release button component 554 and biasing number 550 automatically returns pin 540 to a disengaged position. LAG 100 is in condition for operation.

As spindle lock mechanism 500 engages the pinion gear 512 of LAG 100 in order to operate, spindle lock mechanism 500 can be more robust than other such assemblies. Engagement with pinion gear 512 allows for less stress on pin 540 due to gear reduction the gear set 510. Furthermore the features of spindle lock mechanism 500, such as the shape of pinion gear 512, can help prevent coast down engagement of pin 540 and pinion gear 512.

The components of spindle lock mechanism 500 can be made from a variety of relatively rigid materials well known in the art. Furthermore, the configuration of spindle lock mechanism 500 and the individual components thereof can vary according to the principles of the present disclosure. As such, spindle lock mechanism 500 and the individual components thereof should be understood as not being limited to the embodiments disclosed herein.

Safety Mechanism

Referring to FIGS. 1-2 and 32-34, LAG 100 can include a safety mechanism 128. Safety mechanism 128 can inhibit unintended operation of LAG 100 by mechanical interaction with switch mechanism 126. According to the principles of the present disclosure, safety mechanism 128 is separate and independent from switch mechanism 126 and can be adapted to work with a variety of conventional switches. Therefore, safety mechanism 128 can provide for cost effective production of LAG 100 such as by simplified design and manufacturing.

As described above, exemplary switch mechanism 126 is operable to selectively supply power to motor 124. Switch mechanism 126 is in electrical communication with motor 124 as well as a power source (not shown, via a cord 590 shown in FIG. 2). Handle portion 114 preferably includes an opening 592 (FIG. 2) opposite field case 116 through which cord 590 runs.

Figure 32:
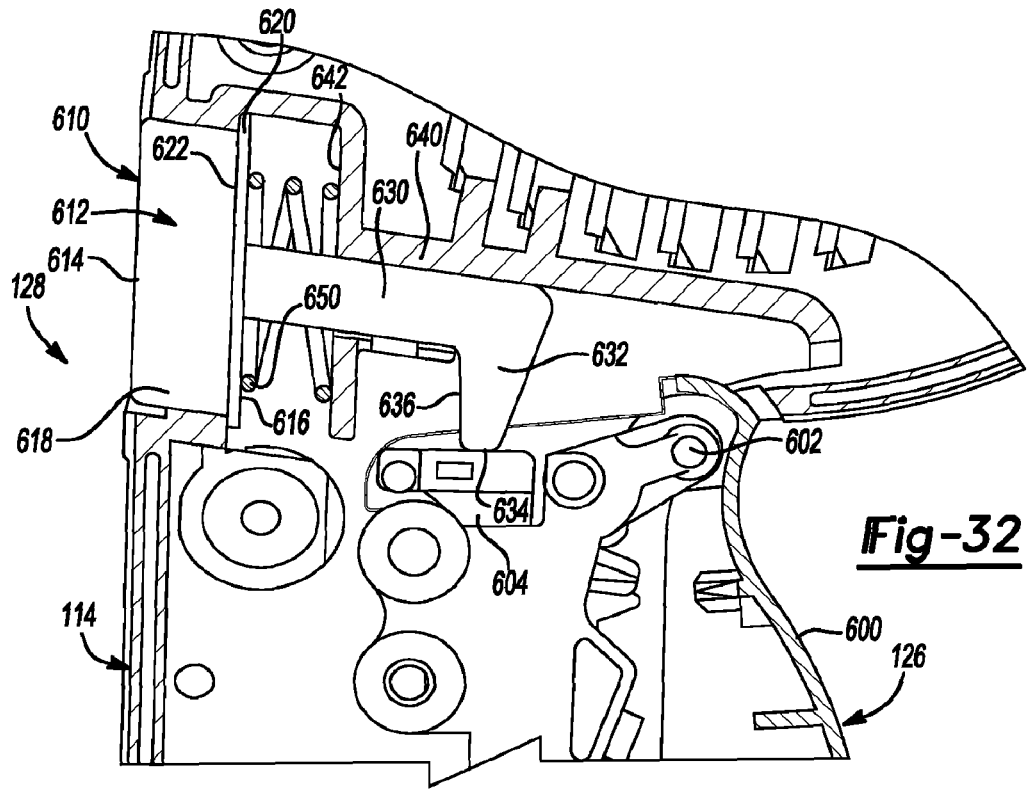
FIG. 32 is a cross sectional view of a handle portion of a large angle grinder including a disengaged safety switch and trigger assembly according to the principles of the present disclosure.
Figure 33:
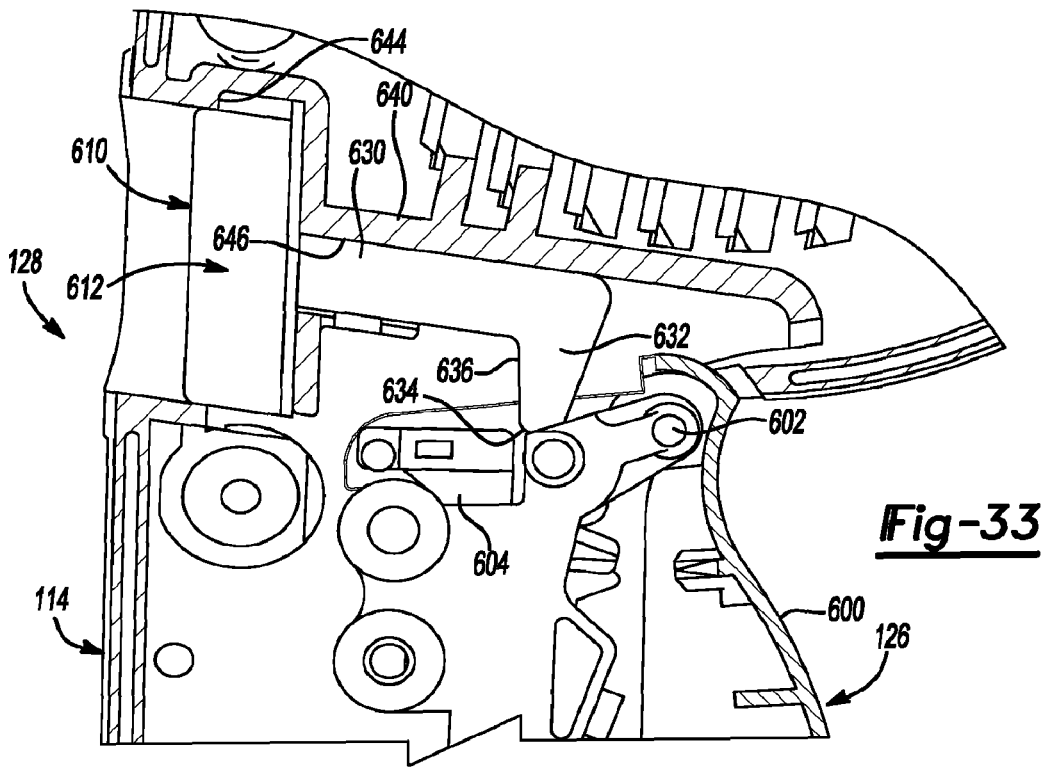
FIG. 33 is a cross sectional view of the handle portion of FIG. 32 including an engaged safety switch and a disengaged trigger assembly.

Switch mechanism 126 can include a trigger or main portion 600 pivotably supported at a pivot point 602. Main portion 600 is normally away from handle portion 114 in an OFF position (FIGS. 32-33). Depression of main portion 600 toward handle portion 114 locates main portion 600 in an ON position (FIG. 34) and initiates operation of LAG 100. Switch mechanism 126 can include a variety of additional components coupled to main portion 600 within handle 114. For example, a lever 604 is coupled to main portion 600 and moves along handle 114 according to the position of main portion 600.

However, as shown in FIG. 32, safety mechanism 128 can have a main component 610 blocking the movement of lever 604 and, therefore, the operation of switch mechanism 126. Thus, in order to locate main portion 600 to the ON position, safety mechanism 128 must be operated.

Safety mechanism 128 can be disposed in handle portion 114 proximate switch mechanism 126. Main component 610 of safety mechanism 128 can have a button portion 612. Button portion 612 includes first and second surfaces 614, 616 and an outside surface 618 extending therebetween. Button portion 612 further includes a lip 620 extending outwardly from outside surface 618 proximate second surface 616. A top surface 622 of lip 620 is defined opposite second surface 616. Main component 610 further includes a finger 630 extending from second surface 616. Finger 630 has a protrusion 632 extending therefrom. Protrusion 632 has a first surface 634 on an outer part thereof and a second surface 636 between finger 630 and first surface 634.

Main component 610 of safety mechanism 128 is received by an inner feature 640 of handle portion 114. Inner feature 640 includes a main surface 642 and a lip engagement surface 644. Furthermore, inner feature 640 has an aperture 646 through which finger 630 can extend.

Safety mechanism 128 further includes a spring 650 coupled between main component 610 and inner feature 640. In particular, spring 650 engages second surface 616 of button portion 612 and main surface 642 of inner feature 640.

As noted above, safety mechanism 128 must be depressed in order to allow switch mechanism 126 to be operated. Safety mechanism 128 is normally in an undepressed position (FIG. 32). Spring 650 biases main component 610 outwardly until top surface 622 of lip 620 engages lip engagement surface 644 of inner feature 640. Main component 610 is configured so that in this position first surface 634 of protrusion 632 engages lever 604. This engagement prevents operation of LAG 100 by creating a mechanical lock that inhibits movement of lever 604 and thus rotation of main portion 600 of switch mechanism 126.

When main component of 610 of safety mechanism 128 is depressed, button portion 612 main component 610 moves along inner feature 640 (FIG. 33). Second surface 616 of button portion 612 engages main surface 642 of inner feature 640. Furthermore, protrusion 632 moves to a position where first surface 634 is not engaged with lever 604.

With main component 610 and lever 604 disengaged, main portion 600 of switch mechanism 126 can be depressed. Depression of main portion 600 rotates main portion 600 about pivot point 602 and moves lever 604 adjacent second surface 636 of protrusion 632 of main component 610 (FIG. 34). As such, lever 604 holds safety mechanism 128 in the depressed position while main portion 600 remains depressed and switch mechanism 126 in the ON position. When switch mechanism 126 is released to the OFF position, spring 650 can automatically bias safety mechanism back to the undepressed position.

Switch mechanism 126 can further include a lock-on button 664 (FIG. 1). Lock-on button 664 can be engaged when switch mechanism 126 is in the ON position to maintain the position.

The components of switch mechanism 126 and safety mechanism 128 can be made from a variety of relatively rigid materials well known in the art. Furthermore, the configurations of the individual components of switch mechanism 126 and safety mechanism 128 can vary according to the principles of the present disclosure. As such, switch mechanism 126, safety mechanism 128, and the individual components thereof should be understood as not being limited to the embodiments disclosed herein.

It should be understood that this disclosure is exemplary in nature, and that the principles of the present disclosure are can apply to a variety of angle grinders and other power tools. As such, this disclosure is not limited to the specific embodiments disclosed herein. For example, it should be understood that an angle grinder or other power tool can include one or more of the radial fan assembly, brush card assemblies, spindle lock, and safety switch disclosed herein.

What is claimed is:

1. An angle grinder comprising:
a field case having a handle disposed at an end thereof;
a motor disposed within said field case, said motor having a spindle extending axially therefrom, said motor spindle having a pinion gear fixed to an end thereof for rotation with said motor spindle;
a gear case coupled to an end of said field case opposite said handle, said gear case including a wheel spindle extending therefrom, said wheel spindle being operably coupled to said pinion gear and being adapted to receive an attachment for the angle grinder for rotation therewith; and
a lock mechanism supported by said gear case, said lock mechanism being selectively operable to engage said pinion gear and inhibit rotation of said wheel spindle.

2. The angle grinder of claim 1, wherein said lock mechanism includes a pin coupled to said gear case, a button coupled to an end of said pin outside of said gear case, and a biasing member disposed between said pin and said gear case, and wherein said pinion gear includes an aperture therein adapted to receive said pin.

3. The angle grinder of claim 1, wherein said biasing member locates said pin in a disengaged position relative to said pinion gear, and said button is selectively operable to locate said pin in said aperture and in engagement with said pinion gear to inhibit rotation of said wheel spindle.

4. The angle grinder of claim 1, wherein said biasing member is a spring.

5. The angle grinder of claim 1, wherein said pinion gear has an elliptical cross section.

* * * * *